(12) United States Patent
Bradbury et al.

(10) Patent No.: US 10,445,248 B2
(45) Date of Patent: *Oct. 15, 2019

(54) HOST PAGE MANAGEMENT USING ACTIVE GUEST PAGE TABLE INDICATORS

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US); Lisa Cranton Heller, Rhinebeck, NY (US); Christian Jacobi, Poughkeepsie, NY (US); Damian L. Osisek, Vestal, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/801,360

(22) Filed: Nov. 2, 2017

(65) Prior Publication Data

US 2018/0067868 A1 Mar. 8, 2018

Related U.S. Application Data

(63) Continuation of application No. 15/212,492, filed on Jul. 18, 2016, now Pat. No. 10,176,111.

(51) Int. Cl.
*G06F 12/10* (2016.01)
*G06F 12/1027* (2016.01)
(Continued)

(52) U.S. Cl.
CPC ...... *G06F 12/1027* (2013.01); *G06F 12/1009* (2013.01); *G06F 12/121* (2013.01);
(Continued)

(58) Field of Classification Search
CPC ............ G06F 12/1009; G06F 12/1027; G06F 2212/65

See application file for complete search history.

(56) References Cited

U.S. PATENT DOCUMENTS

| 4,068,303 A | 1/1978 | Morita |
| 4,456,954 A | 7/1984 | Bullions, III et al. |

(Continued)

FOREIGN PATENT DOCUMENTS

| EP | 000067344 A2 | 12/1982 |
| EP | 0145960 A2 | 6/1985 |

(Continued)

OTHER PUBLICATIONS

Alkassar, Eyad, et al., "Automated Verification of a Small Hypervisor," Third International Conference, VSTTE 2010, Edinburgh, UK, Aug. 2010. pp. 41-54.

(Continued)

*Primary Examiner* — Hal Schnee
(74) *Attorney, Agent, or Firm* — Steven Chiu, Esq.; Blanche E. Schiller, Esq.; Heslin Rothenberg Farley & Mesiti P.C.

(57) ABSTRACT

A marking capability is used to provide an indication of whether a block of memory is being used by a guest control program to back an address translation structure. The marking capability includes setting an indicator in one or more locations associated with the block of memory. In a further aspect, the marking capability includes an invalidation facility based on the setting of the indicators.

11 Claims, 26 Drawing Sheets

(51) Int. Cl.
*G06F 12/121* (2016.01)
*G06F 12/1009* (2016.01)

(52) U.S. Cl.
CPC .... *G06F 2212/657* (2013.01); *G06F 2212/68* (2013.01); *G06F 2212/70* (2013.01)

(56) References Cited

U.S. PATENT DOCUMENTS

| | | | |
|---|---|---|---|
| 4,525,778 A | 6/1985 | Cane | |
| 4,733,350 A | 3/1988 | Tone | |
| 4,779,188 A | 10/1988 | Gum et al. | |
| 4,821,171 A | 4/1989 | Calamari | |
| 5,073,851 A | 12/1991 | Masterson | |
| 5,317,705 A | 5/1994 | Gannon et al. | |
| 5,317,754 A | 5/1994 | Blandy | |
| 5,428,757 A | 6/1995 | Sutton | |
| 5,491,806 A | 2/1996 | Horstmann et al. | |
| 5,574,878 A | 11/1996 | Onodera | |
| 5,896,520 A | 4/1999 | Ohminato et al. | |
| 5,940,872 A | 8/1999 | Hammond et al. | |
| 5,978,892 A | 11/1999 | Noel | |
| 6,079,013 A | 6/2000 | Webb | |
| 6,263,403 B1 | 7/2001 | Traynor | |
| 6,332,163 B1 | 12/2001 | Bowman-Amuah | |
| 6,430,667 B1 | 8/2002 | Leon | |
| 6,604,187 B1 | 8/2003 | McGrath et al. | |
| 6,631,447 B1 | 10/2003 | Morioka | |
| 6,961,806 B1 | 11/2005 | Agesen | |
| 7,114,054 B2 | 9/2006 | Greer | |
| 7,117,338 B2 | 10/2006 | Brewer | |
| 7,197,585 B2 | 3/2007 | Farrell et al. | |
| 7,284,100 B2 | 10/2007 | Slegel et al. | |
| 7,296,139 B1 | 11/2007 | Case et al. | |
| 7,296,265 B1 | 11/2007 | Krishnan et al. | |
| 7,299,337 B2 | 11/2007 | Traut et al. | |
| 7,334,108 B1 | 2/2008 | Case et al. | |
| 7,363,463 B2 | 4/2008 | Sheu et al. | |
| 7,376,949 B2 | 5/2008 | Lowell et al. | |
| 7,409,487 B1 | 8/2008 | Chen et al. | |
| 7,454,590 B2 | 11/2008 | Jordan et al. | |
| 7,509,475 B2 | 3/2009 | Shinohara et al. | |
| 7,543,291 B2 | 6/2009 | Lesartr et al. | |
| 7,562,179 B2 | 7/2009 | Brandt et al. | |
| 7,624,240 B1 | 11/2009 | Colbert | |
| 7,636,831 B1 | 12/2009 | Subrahmanyam | |
| 7,650,482 B2 | 1/2010 | Traut et al. | |
| 7,657,659 B1 | 2/2010 | Lambeth | |
| 7,661,102 B2 | 2/2010 | Ogle | |
| 7,734,892 B1 | 6/2010 | Rozas et al. | |
| 7,814,287 B2 | 10/2010 | Pratt | |
| 7,836,275 B2 | 11/2010 | Anderson et al. | |
| 7,865,670 B2 | 1/2011 | Cota-Robles et al. | |
| 7,941,799 B2 | 5/2011 | Easton et al. | |
| 8,015,388 B1 | 9/2011 | Rihan et al. | |
| 8,032,716 B2 | 10/2011 | Heller et al. | |
| 8,095,771 B2 | 1/2012 | Sheu et al. | |
| 8,127,098 B1 | 2/2012 | Klaiber et al. | |
| 8,151,085 B2 | 4/2012 | Deutschle et al. | |
| 8,166,239 B2 | 4/2012 | Fertig et al. | |
| 8,301,863 B2 | 10/2012 | Hall et al. | |
| 8,307,191 B1 | 11/2012 | Jain | |
| 8,380,907 B2 | 2/2013 | Heller et al. | |
| 8,387,049 B2 | 2/2013 | Adlung et al. | |
| 8,397,050 B2 | 3/2013 | Chang et al. | |
| 8,438,363 B1 | 5/2013 | Koryakin et al. | |
| 8,452,942 B2 | 5/2013 | Slegel et al. | |
| 8,490,085 B2 | 7/2013 | Devaux | |
| 8,738,932 B2 | 5/2014 | Lee et al. | |
| 8,745,356 B2 | 6/2014 | Maruyama | |
| 8,930,635 B2 | 1/2015 | Woffinden | |
| 8,954,709 B2 | 2/2015 | Nishiguchi et al. | |
| 9,069,715 B2 | 5/2015 | Deutschle et al. | |
| 9,075,721 B2 | 7/2015 | Tamura | |
| 9,081,707 B2 | 7/2015 | Conrad et al. | |
| 9,086,989 B2 | 7/2015 | Gupta et al. | |
| 9,092,382 B2 | 7/2015 | Deutschle et al. | |
| 9,182,984 B2 | 11/2015 | Greiner et al. | |
| 9,330,018 B2 | 5/2016 | Duetschle et al. | |
| 9,697,135 B2 | 7/2017 | Deutschle et al. | |
| 9,798,597 B1 | 10/2017 | Duale et al. | |
| 9,858,198 B2 | 1/2018 | Seiler | |
| 10,162,764 B2 | 12/2018 | Bradbury | |
| 10,168,902 B2 | 1/2019 | Bradbury | |
| 10,169,243 B2 | 1/2019 | Bradbury | |
| 10,176,006 B2 | 1/2019 | Heller | |
| 10,176,110 B2 | 1/2019 | Bradbury | |
| 10,176,111 B2 | 1/2019 | Bradbury | |
| 10,180,909 B2 | 1/2019 | Bradbury | |
| 10,180,910 B2 | 1/2019 | Bradbury | |
| 10,223,281 B2 | 3/2019 | Bradbury | |
| 10,241,924 B2 | 3/2019 | Bradbury | |
| 10,248,573 B2 | 4/2019 | Bradbury | |
| 10,282,305 B2 | 5/2019 | Borntraeger | |
| 2004/0064618 A1 | 4/2004 | Farrell et al. | |
| 2004/0117593 A1 | 6/2004 | Uhlig et al. | |
| 2004/0225765 A1 | 11/2004 | Greer | |
| 2006/0259734 A1 | 11/2006 | Sheu et al. | |
| 2006/0294288 A1 | 12/2006 | Seth | |
| 2007/0016904 A1 | 1/2007 | Adlung et al. | |
| 2007/0050594 A1 | 3/2007 | Augsburg | |
| 2007/0112999 A1 | 5/2007 | Oney | |
| 2008/0016315 A1 | 1/2008 | Cohen | |
| 2008/0133875 A1 | 6/2008 | Cohen | |
| 2008/0155168 A1 | 6/2008 | Sheu | |
| 2008/0201540 A1 | 8/2008 | Sahita et al. | |
| 2008/0320216 A1 | 12/2008 | Fertig et al. | |
| 2009/0013149 A1 | 1/2009 | Uhlig et al. | |
| 2009/0158004 A1 | 6/2009 | Hasegaw et al. | |
| 2009/0216928 A1 | 8/2009 | Heller et al. | |
| 2009/0216984 A1 | 8/2009 | Gainey, Jr. et al. | |
| 2010/0074146 A1 | 3/2010 | Banks | |
| 2010/0250895 A1 | 9/2010 | Adams | |
| 2010/0274987 A1 | 10/2010 | Subrahmanyam et al. | |
| 2011/0082962 A1 | 4/2011 | Horovitz et al. | |
| 2011/0320755 A1 | 12/2011 | Blake et al. | |
| 2012/0017039 A1 | 1/2012 | Margetts | |
| 2012/0246387 A1 | 9/2012 | Kanno | |
| 2012/0331266 A1 | 12/2012 | Anraku | |
| 2013/0042066 A1 | 2/2013 | Price | |
| 2013/0246605 A1 | 9/2013 | Mahadik et al. | |
| 2013/0339655 A1 | 12/2013 | Hom et al. | |
| 2013/0339656 A1 | 12/2013 | Greiner et al. | |
| 2013/0339657 A1 | 12/2013 | Greiner et al. | |
| 2014/0047456 A1 | 2/2014 | Haba | |
| 2014/0095840 A1 | 4/2014 | Heller | |
| 2014/0101401 A1 | 4/2014 | Mulcahy et al. | |
| 2014/0129798 A1 | 5/2014 | Deutschle et al. | |
| 2014/0129800 A1 | 5/2014 | Deutschle et al. | |
| 2014/0230077 A1 | 8/2014 | Muff et al. | |
| 2014/0325167 A1 | 10/2014 | Slegel et al. | |
| 2014/0331224 A1 | 11/2014 | Robenko et al. | |
| 2015/0058522 A1 | 2/2015 | Armstrong et al. | |
| 2015/0089116 A1 | 3/2015 | Chin et al. | |
| 2015/0100748 A1 | 4/2015 | Farrell et al. | |
| 2015/0106599 A1 | 4/2015 | Gainey, Jr. et al. | |
| 2015/0120985 A1 | 4/2015 | Frey et al. | |
| 2015/0149997 A1 | 5/2015 | Tsirkin et al. | |
| 2015/0151056 A1 | 6/2015 | Deguillard et al. | |
| 2015/0161056 A1 | 6/2015 | Deguillard et al. | |
| 2015/0242227 A1 | 8/2015 | Nair | |
| 2015/0269085 A1 | 9/2015 | Gainey | |
| 2015/0331802 A1 | 11/2015 | Cain, III et al. | |
| 2015/0370592 A1 | 12/2015 | Tuch et al. | |
| 2016/0292082 A1 | 10/2016 | Craddock et al. | |
| 2017/0003964 A1 | 1/2017 | Bartik et al. | |
| 2017/0024326 A1 | 1/2017 | Luo | |
| 2017/0123996 A1 | 5/2017 | Kishan | |
| 2017/0249261 A1 | 8/2017 | Durham | |
| 2017/0371695 A1 | 12/2017 | Sanjeepan | |
| 2018/0018281 A1 | 1/2018 | Bradbury et al. | |
| 2018/0018283 A1 | 1/2018 | Borntraeger et al. | |
| 2018/0018284 A1 | 1/2018 | Borntraeger et al. | |

(56) References Cited

U.S. PATENT DOCUMENTS

| | | |
|---|---|---|
| 2018/0052777 A1 | 2/2018 | Bradbury et al. |
| 2019/0108135 A1 | 4/2019 | Bradbury |

FOREIGN PATENT DOCUMENTS

| | | |
|---|---|---|
| EP | 002248025 B1 | 3/2012 |
| EP | 2862059 | 4/2015 |
| JP | S61156445 A | 7/1986 |
| JP | 4769308 | 9/2011 |
| KR | 101287448 B1 | 7/2013 |
| TW | 201413454 | 4/2014 |
| WO | WO2006039057 A3 | 4/2006 |
| WO | WO2013101378 A1 | 7/2013 |
| WO | WO2014036004 A1 | 3/2014 |
| WO | WO2015009318 A1 | 1/2015 |
| WO | WO2015145620 A1 | 1/2015 |

OTHER PUBLICATIONS

Arya, K., et al., "Tesseract: Reconciling Guest I/O and Hypervisor Swapping in a VM," ACM SIGPLAN Notices, 49(7), Mar. 2014, pp. 15-28.

Axnix, C. et al., "IBM z13 Firmware Innovations for Simultaneous Multithreading and I/O Virtualization," IBM Journal of Research and Development, vol. 59, No. 4/5, Paper 11, Jul./Sep. 2015, pp. 11:1-11:11.

Caraman, Mihai, "Patchwork KVM: PPC: e500mc: Relax TLB Invalidation Condition on VCPU Schedule," Jun. 2014, pp. 1-9.

Coscarella, et al., "System for Purging TLB," IP.com No. 000052724, Feb. 2005, pp. 1-2 (+ cover).

Frey, B.G., & Mueller, M.J., "Translation Lookaside Buffer Castout Queue," IP.com No. IPCOM000120766D, Apr. 2, 2005, pp. 106-107 (+ cover).

IBM, "Power ISA V2.07B", Apr. 9, 2015, pp. 1-1527.

IBM, "System /370 Extended Architecture/Interpretive Execution," IBM Publication No. SA22-7095-01, Sep. 1985, pp. 1-32.

IBM, "z/Architecture—Principles of Operation," IBM Publication No. SA22-7832-10, 11th Edition, Mar. 2015, pp. 1-1732.

IBM, "z/VM: Running Guest Operating Systems," IBM® Publication No. SC24-5997-02, Oct. 2001, pp. 1-179.

IPCOM000128917, IBM, "IBM System/370 Systems Principles of Operation," IP.com No. 000128917, pp. 1-356 (+ cover).

IPCOM000146587D, Anonymous, "An Efficient TLB Virtualization Algorithm Using Machine Contiguous Page Information in a Virtualization Environment," Feb. 16, 2017, pp. 1-4.

IPCOM000192722D, MIHM, Thomas, Jr., et al., "Four Reasons Your Next Mobile Product Should have a Hypervisor," Feb. 2010, pp. 1-8.

IPCOM000222815D, Anonymous, "Multi-Level Nested Translation Lookaside Buffers," Oct. 23, 2012, p. 1 (+ cover).

Kerrigan, et al., "Table Lookaside Buffer with Selective Space Invalidation," IP.com No. 000087098, Mar. 2005, p. 1 (+ cover).

Mel, Peter and Tim Grance, "The NIST Definition of Cloud Computing," National Institute of Standards and Technology, Information Technology Laboratory, Special Publication 800-145, Sep. 2011, pp. 1-7.

Nordholz, Jan et al., "XNPro: Low-Impact Hypervisor-Based Execution Prevention on ARM," TrustED, Oct. 2015, pp. 55-64.

Osisek, et al., "ESA/390 interpretive-execution architecture, foundation for VM/ESA," IBM Systems Journal, vol. 30, No. 1, Jan. 1991, pp. 34-51.

Samanta, et al., "Dynamic Aggregation of Virtual Addresses in TLB using TCAM Cells," 21st International Conference on VLSI Design, Jan. 2008, pp. 243-248.

Schwarz, et al., "The Microarchitecture of the IBM eServer z900 Processor," IBM Journal of Research and Development 46, No. 4, Jul. 2002, pp. 381-395.

Sobania, Jan-Arne et al., "Towards Symmetric Multi-Processing Support for Operating Systems on the SCC," 4th MARC Symposium, Dec. 2011, pp. 73-78.

Vahidi, A. et al., "VETE: Virtualizing the Trusted Execution Environment," SICS Technical Report T2013:02, Mar. 2013, pp. 1-35.

Venkatasubramanian, et al., "TMT—A TLB Tag Management Framework for Virtualized Platforms," 21st Annual Symposium on Computer Architecture and High Performance Computing, Oct. 2009, pp. 153-160.

Whang, Z., et al., "Hypersafe: A Lightweight Approach to Provide Lifetime Hypervisor Control-Flow Integrity," 2010 IEEE Symposium on Security and Privacy, May 2010, pp. 380-395.

Yu, Cong et al., "Protecting the Security and Privacy of the Virtual Machine through Privilege Separation," Proceedings of the 2nd International Conference on Computer Science and Electronics Engineering, 2013 (no further date information available), pp. 2224-2228.

Bradbury, et al., "Host Page Management Using Active Guest Page Table Indicators," U.S. Appl. No. 15/212,492, filed Jul. 18, 2016 (108 pages).

Bradbury, et al., "Host-Based Resetting of Active Use of Guest Page Table Indicators," U.S. Appl. No. 15/212,477, filed Jul. 18, 2016 (79 pages).

Bradbury, et al., "Marking Storage Keys to Indicate Memory Used to Back Address Translation Structures," U.S. Appl. No. 15/212,462, filed Jul. 18, 2016 (71 pages).

Bradbury, et al., "Reducing Over-Purging of Structures Associated with Address Translation Using an Array of Tags," U.S. Appl. No. 15/212,436, filed Jul. 18, 2016 (88 pages).

Bradbury, et al., "Managing Memory Used to Back Address Translation Structures," U.S. Appl. No. 15/212,409, filed Jul. 18, 2016 (72 pages).

Bradbury, et al., "Reducing Purging of Structures Associated with Address Translation," U.S. Appl. No. 15/212,396, filed Jul. 18, 2016 (57 pages).

Bradbury, et al., "Reducing Over-Purging of Structures Associated with Address Translation," U.S. Appl. No. 15/212,347, filed Jul. 18, 2016 (83 pages).

Bradbury, et al., "Marking Page Table/Page Status Table Entries to Indicate Memory Used to Back Address Translation Structures," U.S. Appl. No. 15/212,379, filed Jul. 18, 2016 (71 pages).

Bradbury, et al., "Marking to Indicate Memory Used to Back Address Translation Structures," U.S. Appl. No. 15/212,524, filed Jul. 18, 2016 (69 pages).

Borntraeger, et al., "Selective Purging of Guest Entries of Structures Associated with Address Translation," U.S. Appl. No. 15/212,503, filed Jul. 18, 2016 (56 pages).

Heller, et al., "Delaying Purging of Structures Associated with Address Translation," U.S. Appl. No. 15/212,360, filed Jul. 18, 2016 (66 pages).

Bradbury, et al., "Increasing the Scope of Local Purges of Structures Associated with Address Translation," U.S. Appl. No. 15/212,546, filed Jul. 18, 2016 (69 pages).

Borntraeger, et al., "Selective Purging of Entries of Structures Associated with Address Translation in a Virtualized Environment," U.S. Appl. No. 15/212,570, filed Jul. 18, 2016 (57 pages).

Bradbury et al, "Host-Based Resetting of Active Use of Guest Page Table Indicators", U.S. Appl. No. 15/799,106, filed Oct. 31, 2017 (74 pages).

Bradbury et al., "Marking Storage Keys to Indicate Memory Used to Back Address Translation Structures", U.S. Appl. No. 15/801,359, filed Nov. 2, 2017 (65 pages).

List of IBM Patents or Patent Applications Treated as Related, Dec. 12, 2017, pp. 1-2.

IBM, "z/Architecture—Principles of Operation," SA22-7832-10, Eleventh Edition, Mar. 2015, pp. 10-36 thru 10-39 (+ cover).

List of IBM Patents or Patent Applications Treated as Related, May 17, 2019, pp. 1-2.

IBM, "PJ40387: Provide Local IPTE Support," Oct. 2012, http://www-01.ibm.com/support/docview.wss?uid=swgIPJ40387, pp. 1-7.

Brown et al., Fundamentals of Digital Logic with Verilog Design, Jul. 2002, pp. 367-368 (+ cover).

ESSA R₁, R₂, M₃

REGISTER SPECIFIED BY R₁

HOST PAGE MANAGEMENT USING ACTIVE GUEST PAGE TABLE INDICATORS

CROSS-REFERENCE TO RELATED APPLICATIONS

This application is a continuation of co-pending U.S. patent application Ser. No. 15/212,492, filed Jul. 18, 2016, entitled "HOST PAGE MANANGEMENT USING ACTIVE GUEST PAGE TABLE INDICATORS," which is hereby incorporated herein by reference in its entirety.

BACKGROUND

One or more aspects relate, in general, to processing within a computing environment, and in particular, to processing associated with address translation data structures of a virtual environment.

In computing environments that support virtualization technology, an operating system may be running on a virtual machine on a processor that supports multiple levels of address translation tables. In such an environment, the operating system is a guest of a hypervisor also executing in the computing environment.

Further, in such environments, dynamic address translation (DAT) may be performed during a memory reference to translate a virtual address into a corresponding real or absolute address. This translation typically includes a walk, referred to as a page or DAT walk, of multiple levels of address translation tables in order to determine the real address. This is time consuming, and thus, to improve performance for future translation requests, the virtual address to real or absolute address mapping is stored in an entry of a structure associated with address translation, such as a translation look-aside buffer (TLB) or other such structure.

The translation look-aside buffer is a cache used by the memory management hardware to improve virtual address translation speed. The next time translation for a virtual address is requested, the TLB is checked. If the translation is in the TLB, the real or absolute address is retrieved from the TLB. Otherwise, the DAT walk is performed once again.

At times, it is necessary to purge some or all of the TLB entries used by a particular processor. When this occurs, there is often a performance loss due to having to walk the DAT tables again to recreate the entries.

SUMMARY

Shortcomings of the prior art are overcome and additional advantages are provided through the provision of a computer-implemented method for managing invalidation of entries associated with address translation of a computing environment. The method includes, for instance, obtaining, by a processor, an invalidate request. The invalidate request indicating an entry of a particular address translation structure to be invalidated. Based on obtaining the invalidate request, performing invalidation processing. The invalidation processing includes: determining whether the entry of the particular address translation structure is for a block of memory used to back an address translation structure of a guest program of the computing environment and selectively purging one or more entries in a structure associated with address translation, based on the determining indicating the block of memory is not used to back the address translation structure of the guest program.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a marking capability is used to provide an indication of whether a block of memory (e.g., a page) is backing an address translation structure (e.g., a page table, a segment table, a region table and/or any other table used for address translation) used by a control program, such as an operating system. In one example, the control program is executing as a guest and is managed by a host virtual machine manager, such as a hypervisor. Further, the block of memory is a block of host memory managed by the virtual machine manager. The marking is provided in host memory, such as in a host address translation data structure, including, for instance, a host page table entry (PTE), or in a host page status table entry (PGSTE); and/or in a storage key associated with host memory.

Further, in one aspect, this marking capability includes a selective purging capability that reduces, in certain situations, the over-purging of selected structures. In the examples herein, the selected structures are translation look-aside buffers (TLBs). However, this is only one example, and one or more aspects may apply to other types of structures associated with address translation that undergo purging.

Additionally, in one aspect, the marking capability includes an invalidate facility that performs invalidation processing based on the marking.

Although in the examples herein, the block of memory is a page of memory (e.g., 4 kilobytes (KB)), in other embodiments, the block of memory may be of a different size than a page of memory, and/or the page of memory may be other than 4 KB.

Figure 1:
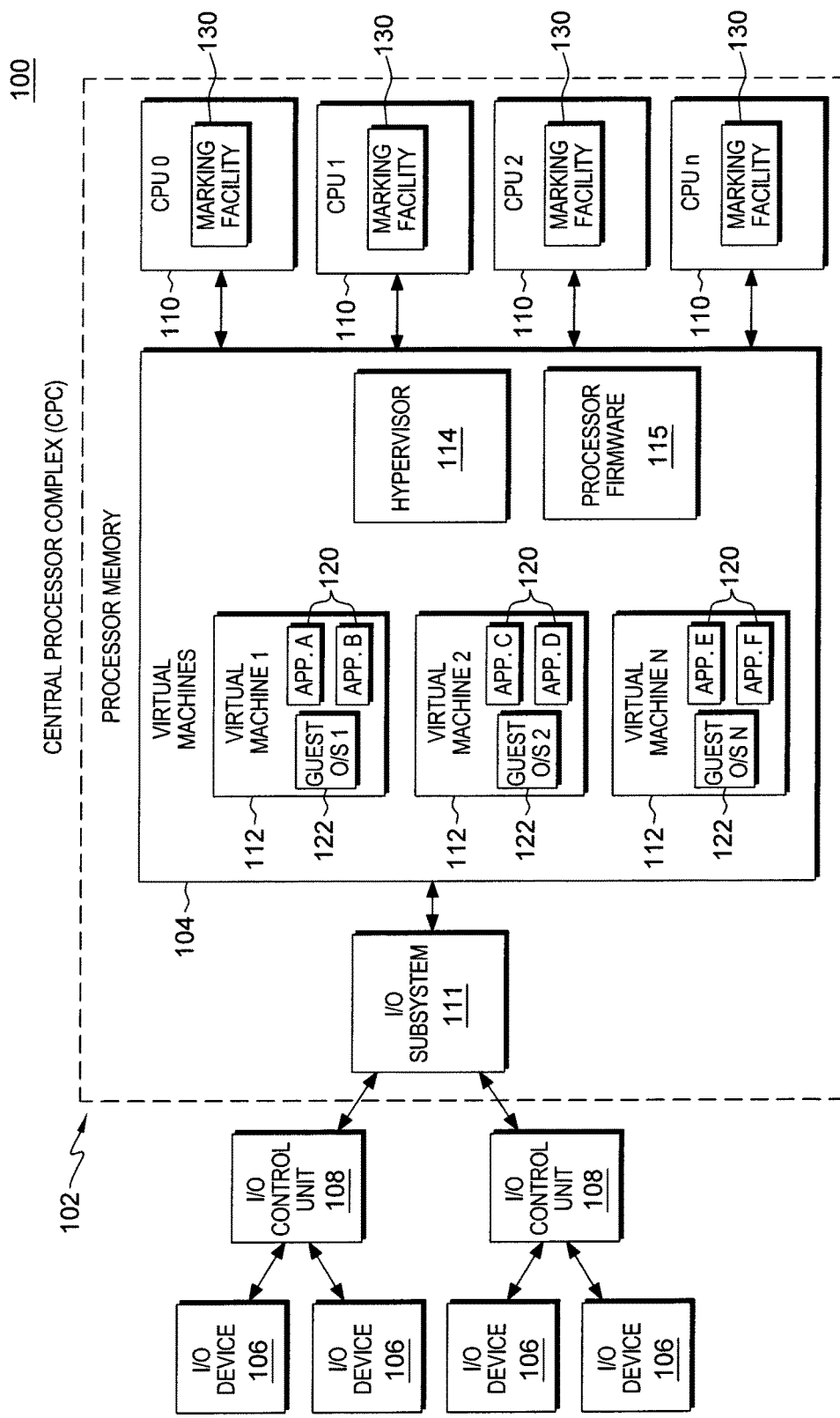
FIG. 1 depicts one example of a virtual computing environment to incorporate and use one or more aspects of a marking facility, in accordance with an aspect of the present invention.

One example of a computing environment to incorporate and use one or more aspects of a marking facility is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, $11^{th}$ Edition, March 2015, which is hereby incorporated by reference herein in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114, that manages the virtual machines, and processor firmware 115. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine. In one embodiment, central processor 110 includes a marking facility 130 used, as described herein, to indicate whether a block of host memory is being used to back a guest address translation structure.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In this particular example, the model of virtual machines is a V=V model, in which the real or absolute memory of a virtual machine is backed by host virtual memory, instead of real or absolute memory. Each virtual machine has a contiguous virtual memory space. The physical resources are managed by host 114, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

In one embodiment, the host (e.g., z/VM®) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretively executed for the guest, including a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception.

Figure 2A:
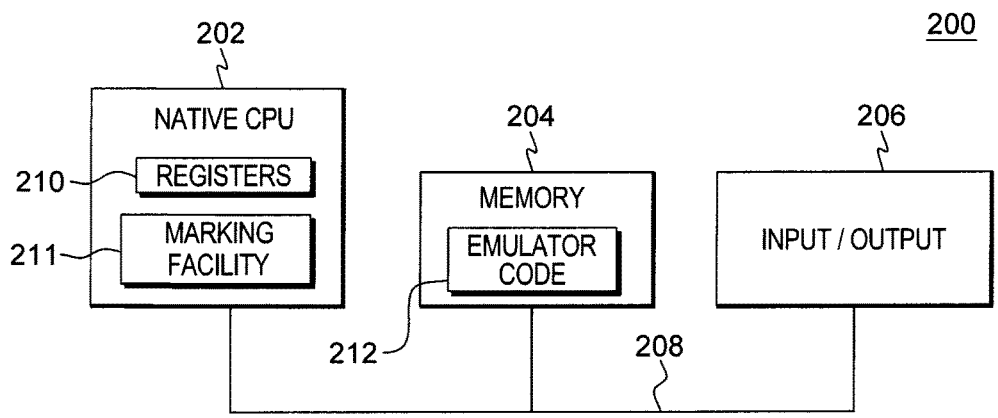
FIG. 2A depicts another example of a computing environment to incorporate and use one or more aspects of a marking facility, in accordance with an aspect of the present invention.

Another example of a computing environment to incorporate and use one or more aspects of the marking facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment, as well as a marking facility 211. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
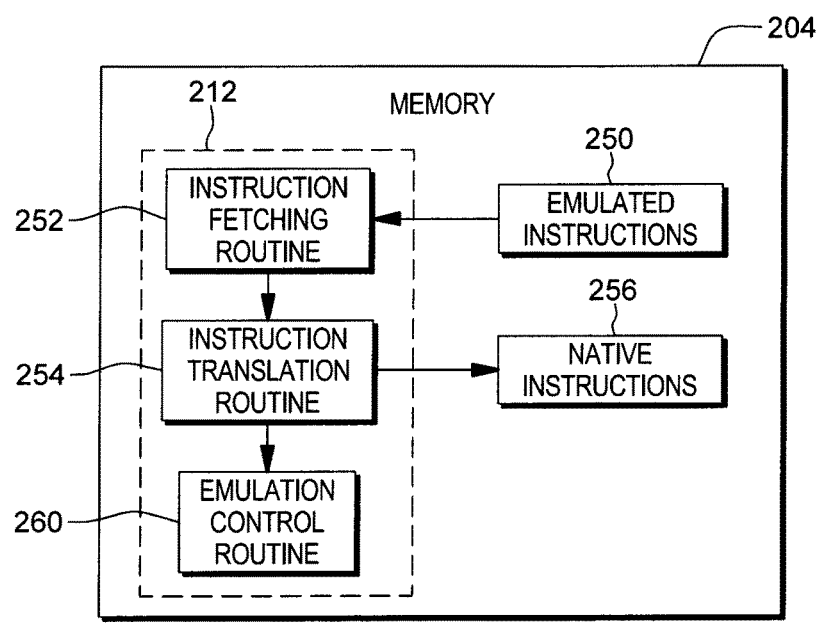
FIG. 2B depicts further details of the memory of FIG. 2A.

Further details relating to emulator code 212 are described with reference to FIG. 2B. Emulated instructions 250 stored in memory 204 comprise software instructions (e.g., correlating to machine instructions) that were developed to be executed in an architecture other than that of native CPU 202. For example, emulated instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more emulated instructions 250 from memory 204, and to optionally provide local buffering for the instructions obtained. It also includes an instruction translation routine 254 to determine the type of emulated instruction that has been obtained and to translate the emulated instruction into one or more corresponding native instructions 256. This translation includes, for instance, identifying the function to be performed by the emulated instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, emulated instructions 250, native instructions 256 and emulator code 212 may reside in the same memory or may be disbursed among different memory devices.

The computing environments described herein support architectural functions, such as dynamic address translation (DAT). With appropriate support by an operating system, the dynamic address translation facility may be used to provide to a user a system in which storage appears to be larger than the main storage which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing embodiments, the interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT multiple times: first at the guest level, to translate a guest virtual address through guest managed translation tables into a guest real address, and then, for a pageable guest, at the host level, to translate the corresponding host virtual address to a host real address.

A sequence of virtual addresses associated with a virtual storage is called an address space, and the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation may be specified for instruction and data addresses generated by the CPU. The real or absolute address that is formed by dynamic address translation, and the absolute address that is then formed by prefixing, in one embodiment, are 64 bits in length. The virtual address may be a primary virtual address, a secondary virtual address, an AR (Access Register)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

Figure 3A:
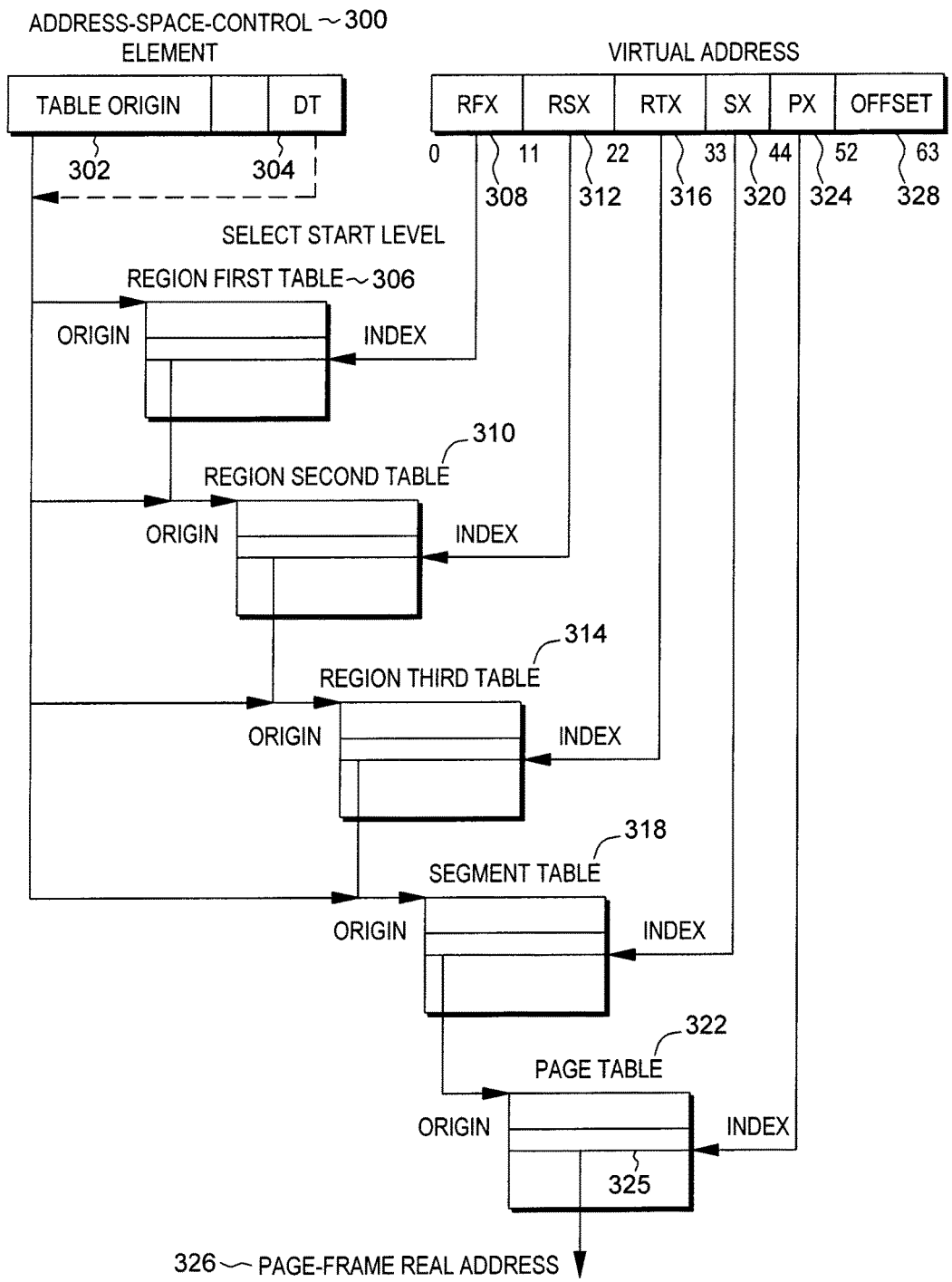
FIG. 3A depicts one example of address translation.

One example of translating a virtual address to a real address is described with reference to FIG. 3A. This process is referred to herein as a DAT walk (or a page walk) in which the address translation tables are walked to translate one address (e.g., a virtual address) to another address (e.g., a real address). In this example, an address space control element (ASCE) 300 includes a table origin 302, as well as a designation type (DT) control 304, which is an indication of a start level for translation (i.e., an indication at which level in the hierarchy address translation is to begin). Using table origin 302 and DT 304, the origin of a particular table is located. Then, based on the table, bits of the virtual address are used to index into the specific table to obtain the origin of the next level table. For instance, if the region first table (RFT) 306 is selected, then bits 0-10 (RFX) 308 of the virtual address are used to index into the region first table to obtain an origin of a region second table 310. Then, bits 11-21 (RSX) 312 of the virtual address are used to index into region second table (RST) 310 to obtain an origin of a region third table 314. Similarly, bits 22-32 (RTX) 316 of the virtual address are used to index into region third table (RTT) 314 to obtain an origin of a segment table 318. Then, bits 33-43 (SX) 320 of the virtual address are used to index into segment table 318 to obtain an origin of page table 322, and bits 44-51 (PX) 324 of the virtual address are used to index into page table 322 to obtain a page table entry (PTE) 325 having a page frame real address (PFRA) 326. The page frame real address is then combined (e.g., concatenated) with offset 328 (bits 52-63) to obtain a real address. Prefixing may then be applied to obtain the corresponding absolute address.

Another example of address translation is described with reference to FIG. 3B. In this example, a DAT walk is performed to translate an initial guest virtual address to a final host real address. In this example, address space control element (ASCE) 300 is a guest address space control element, and DT 304 of ASCE 300 indicates that guest translation determined by guest address translation structure 360 is to start at region first table 306 pointed to by table origin 302. Thus, the appropriate bits of the initial guest virtual address (e.g., RFX 308) are used to index into region first table 306 to obtain a pointer of an entry of the region first table. The address of the region first table entry (RFTE) is a guest real or absolute address. This guest real or absolute address, with the main storage origin and limit applied, when appropriate, corresponds to a host virtual address. This intermediate host virtual address is then translated using host address translation structures 370. In particular, address space control element (ASCE) 350 is a host address space control element used to indicate a start level for translation in host address translation structures 372. Based on the start level (e.g., region first table) indicated by DT 354, the particular bits of the host virtual address are used to index into the indicated table with table origin 352 to be used for translation using host address translation 372, as described with reference to FIG. 3A. The translation of the host virtual address corresponding to the guest RFTE continues until a host page frame real address (PFRA) 374a is obtained.

Data at the intermediate host page frame real address is a pointer to the next level of guest address translation structures (e.g., guest region second table 310, in this particular example), and translation continues, as described above. Specifically, host address translation structures 376, 378, 380 and 382 are used to translate the intermediate host virtual addresses associated with the guest region second table 310, region third table 314, segment table 318 and page table 322, respectively, resulting in host PFRAs 374b, 374c, 374d and 374e, respectively. Host page frame real address 374e includes the address of a guest page table entry 325. Guest page table entry 325 includes a guest page frame real address 326, which is concatenated with the offset from the initial guest virtual address to obtain the corresponding guest absolute address. In some cases, the main storage origin and limit are then applied to calculate the corresponding host virtual address, which is then translated, as described above, using address translation structures 384 to obtain host page frame real address 374f. The host page frame real address is then combined (e.g., concatenated) with the offset (e.g., bits 52-63) of the host virtual address to obtain the final host real address. This completes translation of a guest virtual address to a host real address.

Although in the above examples, translation starts at the region first table, this is only one example. Translation may start at any level for either the guest or the host.

In one embodiment, to improve address translation, the virtual address to real or absolute address translation mapping is stored in an entry of a translation look-aside buffer (TLB). The TLB is a cache used by the memory management hardware to improve virtual address translation speed. The next time translation for a virtual address is requested, the TLB will be checked and if it is in the TLB, there is a TLB hit and the real or absolute address is retrieved therefrom. Otherwise, a page walk is performed, as described above.

As indicated, guest translations may be included in the TLB. These entries may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 372, 376, 378, 380 and 382, as well as the final host translation 384, as described in FIG. 3B above. In another example, a hierarchical TLB may contain an entry in a first level of the TLB which buffers a translation from the initial guest virtual address down to the associated origin of the guest page table 322 and a separate entry from a second level of the TLB which buffers the translation from the guest page table entry address down to the final host real or absolute address. In this example, guest entries in the first level of the TLB implicitly include intermediate host translations 372, 376, 378 and 380 which correspond to the host translations which back guest region and segment tables, and guest entries in the second level implicitly include intermediate host translation 382 which backs the guest page table and final host translation 384, as described in FIG. 3B. Many implementations of a translation look-aside buffer are possible.

Figure 4:
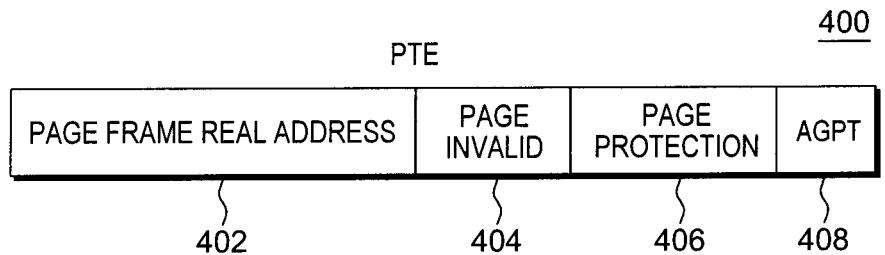
FIG. 4 depicts one example of a page table entry (PTE), in accordance with an aspect of the present invention.

In the above examples, the page frame real address is included in a page table entry of a page table. The page table includes one or more entries, and further details of a page table entry are described with reference to FIG. 4.

In one example, a page table entry (PTE) 400 is associated with a particular page of memory and includes:

(a) Page Frame Real Address (PFRA) 402: This field provides the leftmost bits of a real (in this case, host real) storage address. When these bits are concatenated with the byte index field of the virtual address on the right, the real address is obtained.

(b) Page Invalid Indicator (I) 404: This field controls whether the page associated with the page table entry is available. When the indicator is zero, address translation proceeds by using the page table entry. Further, the host state is r (resident state). When the indicator is one, the page table entry cannot be used for translation, and the host state is p (preserved state) or z (logically zero state), as determined by PGSTE.Z, described below.

(c) Page Protection Indicator 406: This field controls whether store accesses are permitted into the page.

(d) Active Use for Guest Page Table (AGPT) indicator 408: This field is used, in accordance with an aspect of the present invention, to indicate whether this host page is being used by a guest to back an address translation structure, such as a page table, a segment table, a region table, etc. In one example, a one indicates it is not used to back an address translation structure, and a zero indicates it is used.

A page table entry may include more, fewer and/or different fields than described herein. For instance, in the Power Architecture, the PTE may include a reference indicator that indicates whether a corresponding block of memory has been referenced, and/or a change indicator that indicates that a corresponding block of memory has been stored into. Other variations are possible.

Corresponding to a host page table entry, in one example, is a page status table entry (PGSTE). In one embodiment, there is one page status table per host page table, the page status table is the same size as the page table, a page status table entry is the same size as a page table entry, and the page status table is located at a fixed displacement (in host real memory) from the page table. Thus, there is a one-to-one correspondence between each host page table entry and page status table entry. Given the host's virtual address of a guest page, both the machine and the host can easily locate the page status table entry that corresponds to a page table entry for a guest block of memory.

Figure 5:
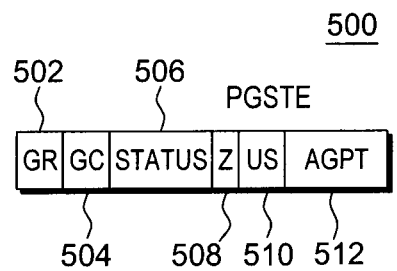
FIG. 5 depicts one example of a page status table entry (PGSTE), in accordance with an aspect of the present invention.

One example of a page status table entry (PGSTE) 500 is described with reference to FIG. 5. Page status table entry 500 includes, for instance, the following:

(a) GR 502: Guest reference backup indicator;
(b) GC 504: Guest change backup indicator;
(c) Status 506: Including, for instance, control bits for coordinating between host and guest operations;

(d) Page Content Logically Zero Indicator (Z) 508: This bit is meaningful when the corresponding PTE page invalid indicator (PTE.I) bit (described above) is one. When Z is one, the content of the page that is described by this PGSTE and corresponding PTE is considered to be zero. Any prior content of the page does not have to be preserved by the host and may be replaced by a page of zeros.

When the Z bit is one and the corresponding PTE.I bit is one, the host state is z (logically zero). This means that the page content may be replaced by the host. When the page content is replaced, the page may be replaced by associating it with a frame that has been set to zeros.

When the Z bit is zero and the PTE invalid bit is one, the host state is p (preserved) and the content of the page is preserved by the host.

(e) Usage State (US) 510: Indicates whether the guest state is S (stable), U (unused), V (volatile) or P (potentially volatile).

(f) Active Use for Guest Page Table (AGPT) indicator 512: This field is used, in accordance with an aspect of the present invention, to indicate whether this host page is being used by a guest to back an address translation structure, such as a page table, a segment table, a region table, etc. In one example, a one indicates it is not used to back an address translation structure, and a zero indicates it is used.

The PGSTE may include more, fewer and/or different fields in one or more embodiments.

Various host states are mentioned above. Further information regarding these states include:

1. Resident (r) state: The guest block is present in a host page frame.
   A host page frame (a.k.a., frame) is a block (e.g., 4K-byte) of host real memory that is used to contain, or back host pages that contain, in this context, guest blocks (a.k.a., block of memory). A host page is a page (e.g., 4K-byte) of virtual memory that is used to implement a block of guest memory. A guest block is a block (e.g., 4K-byte) of memory (on, for instance, a 4K-byte boundary) that the guest views as a block of its physical (or absolute) memory.
2. Preserved (p) state: The guest block is not present in a host page frame, but has been preserved by the host in some auxiliary storage.
3. Logically Zero (z) state: The guest block is not present in a host page frame and the contents of the guest block are known to be zeros.
   The logically zero state is the initial (or default) host state.

The association of guest and host state information also includes the defining of available guest states. As examples, the following guest states are defined:

1. Stable (S) state: The contents of a stable block remain equal to what was set by the guest. The host is responsible for preserving the contents of a block in the stable state, if the backing page frame is reclaimed.
   The stable state is the default guest state of a block.
2. Unused (U) state: The contents of an unused block are not meaningful to the guest. After the guest sets the state of a block to the unused state, the host may at any time discard the contents of the block and reclaim the backing page frame. When the host discards the contents of the block, it changes the host state to z.
   The guest is not to reference a block in the unused state; otherwise, an addressing exception may occur.
3. Volatile (V) state: The contents of a volatile block are meaningful to the guest, but the host may at any time discard the contents of the block and reclaim the backing page frame. The guest can tolerate such loss of the block contents because it has the ability to recreate them. If the host reclaims the backing page frame, the host changes the host state of the block to z.
   The guest may attempt to reference the contents of a block in the guest volatile state. This will either succeed, if the guest/host state of the block is Vr (resident), or will result in a block volatility exception, if the guest/host state of the block is Vz (logically zero).
   Any changes the guest may make to the contents of a block in the guest volatile state will be lost, if the block is discarded.
4. Potentially Volatile (P) state: The contents of a potentially volatile block are meaningful to the guest, but based upon guest change history, the host either may discard or should preserve the contents of the block.
   If the change indicator associated with the block indicates that the block has not been changed, the host may at any time discard the contents of the block and reclaim the backing page frame. The guest can tolerate such a loss of the block contents, because it has the ability to recreate them. If the host discards a potentially volatile block, the host changes the guest/host state of the block to Vz (Volatile and logically zero).
   If the change indicator associated with the block indicates that the block has been changed, the host preserves the contents of the block. When the host preserves the contents on auxiliary storage, it changes the guest/host state of the block from Pr (Potentially Volatile resident) to Sp (Stable preserved).
   The guest P (Potentially Volatile) state offers the benefits of both the V (Volatile) and S (Stable) states. This allows the guest to change the contents of blocks in the guest P state, ensuring block content preservation by the host. For those blocks in the guest P state that are not changed by the guest, the host may efficiently discard the contents and reclaim the host page frame without incurring the overhead associated with block content preservation.

The machine (e.g., firmware other than the guests and host) and the host ensure that the state of the guest block is in one of the following permissible guest/host block states: Sr, Sp, Sz, Ur, Uz, Vr, Vz, or Pr.

Further, in one embodiment, each block of memory, such as each 4k-byte block of real or absolute memory, may have associated therewith a storage key. The storage key provides a reliability mechanism that is used to segregate blocks of storage, ensuring that programs executing in one key do not accidentally store into blocks having a different key. Moreover, a storage key provides indications to an operating system as to which blocks have been referenced and changed, thus allowing the operating system to determine which blocks may need to be written to auxiliary storage.

Figure 6:
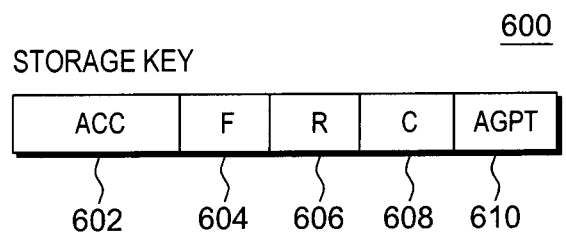
FIG. 6 depicts one example of a storage key, in accordance with an aspect of the present invention.

One example of a storage key is described with reference to FIG. 6. A storage key 600 includes for instance, an access control (ACC) component 602, a fetch protection (F) component 604, a reference (R) component 606, a change (C) component 608, and an Active Use for Guest Page Tables (AGPT) indicator 610, each of which is described below:

Access control bits (ACC) 602: If a reference is subject to key-controlled protection, the access control bits are matched with an access key (e.g., of the program status word or from an instruction operand) when information is stored, or when information is fetched from a location that is protected against fetching.

Fetch-protection bit (F) 604: If a reference is subject to key-controlled protection, the fetch protection bit controls whether key-controlled protection applies to fetch-type references; a 0 indicates that only store-type references are monitored and that fetching with any access key is permitted; a 1 indicates that key-control protection applies to both fetching and storing. No distinction is made between the fetching of instructions and of operands.

Reference bit (R) 606: The reference bit normally is set to 1 each time a location in the corresponding storage block is referred to either for storing or for fetching of information.

Change bit (C) 608: The change bit is set to 1 each time information is stored at a location in the corresponding storage block.

Active Use for Guest Page Tables (AGPT) indicator 610: This field is used, in accordance with an aspect of the present invention, to indicate whether this host page frame is being used to back a guest address translation structure, such as a page table, a segment table, a region table, etc. In one example, a one indicates it is not used to back an address translation structure, and a zero indicates it is used.

Figure 7A:
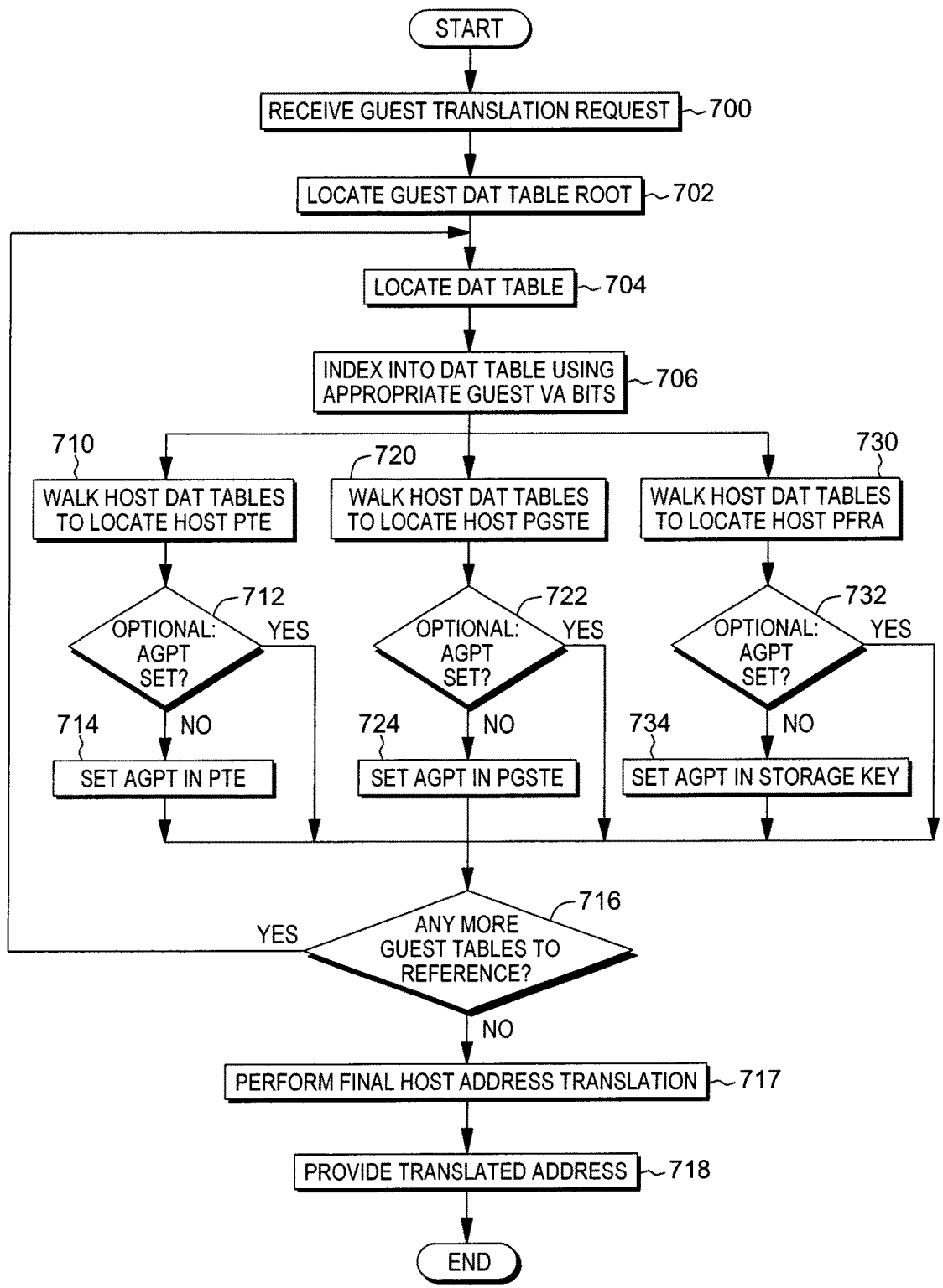
FIG. 7A depicts one example of logic used for marking memory, in accordance with an aspect of the present invention.

As indicated above, the Active Use for Guest Page Tables indicator, regardless of whether in the host PTE, PGSTE, storage key, or another location, is set for a block of memory (e.g., a page) based on a guest control program (e.g., a guest operating system) using the block of memory for an address translation structure (e.g., a page table, a segment table, a region table, and/or any other table used for address translation). Thus, one embodiment of tracking active pages or other blocks of memory supporting guest address translation structures (referred to herein as guest page tables for convenience) is described with reference to FIG. 7A. This logic is performed by a processor.

Initially, the processor receives a guest translation request, e.g., from a program, to translate a virtual address to a real (or absolute) address, STEP 700. Based on receiving the request, a determination is made as to the root of the guest address translation structure, STEP 702. The root is provided, for instance, by the guest address space control element (ASCE) 300. Using the determined root, a guest address translation structure (e.g., DAT table, such as, e.g., a region table, a segment table, a page table, etc.) is located, STEP 704. The processor indexes into the guest DAT table using appropriate bits of the guest virtual address (VA) to obtain an entry in the DAT table, as described with reference to FIGS. 3A-3B, STEP 706. For instance, if the DAT table is region first table 306, then RFX 308 of the guest virtual address is used to obtain an entry in the guest region first table (RFT). Then, host address translation 372 is provided for the address of that (RFT) entry, as described with reference to FIG. 3B, to obtain a host page table entry, a page status table entry, and/or a host real address (PFRA).

Particularly, in one example, the host DAT tables (e.g., host DAT tables 372, in this example) are walked for the address of the indexed guest RFT entry, as described with reference to FIG. 3B, to locate a host page table entry (PTE), STEP 710. A determination is made as to whether the AGPT is set (e.g., equal to zero) in this entry, INQUIRY 712. If it is not set, it is set, STEP 714, and processing continues to INQUIRY 716. Otherwise, if it is already set, processing continues to INQUIRY 716. Optionally, INQUIRY 712 can be bypassed and the AGPT bit can be set (e.g., equal to zero), STEP 714, regardless of its current value.

In a further example, the host DAT tables (e.g., host DAT tables 372, in this example) are walked for the address of the indexed guest RFT entry to locate a host page status table entry (PGSTE), STEP 720. For instance, the DAT tables are walked to locate the page table entry and from there the page status table entry is located. A determination is made as to whether the AGPT is set (e.g., equal to zero) in this entry, INQUIRY 722. If it is not set, it is set, STEP 724, and processing continues to INQUIRY 716. Otherwise, if it is already set, processing continues to INQUIRY 716. Optionally, INQUIRY 722 can be bypassed and the AGPT bit can be set (e.g., equal to zero), STEP 724, regardless of its current value.

In yet a further example, the host DAT tables (e.g., host DAT tables 372, in this example) are walked for the address of the indexed guest RFT entry to locate a host page frame real address (PFRA) 374*a*, STEP 730. For instance, the DAT tables are walked to locate the page table entry and the host page frame real address is obtained therefrom. The host page frame real address is used to locate a corresponding storage key, and a determination is made as to whether the AGPT is set (e.g., equal to zero) in the storage key, INQUIRY 732. If it is not set, it is set, STEP 734, and processing continues to INQUIRY 716. Otherwise, if it is already set, processing continues to INQUIRY 716. Optionally, INQUIRY 732 can be bypassed and the AGPT bit can be set (e.g., equal to zero), STEP 734, regardless of its current value.

At INQUIRY 716, a determination is made as to whether there are any more guest translation tables to be referenced. If so, translation continues with the next level of DAT table (e.g., a region second table 310 if the root was a region first table, as shown in FIGS. 3A-3B), STEP 704. Otherwise, final host address translation is performed, as described in FIG. 3B, STEP 717. For instance, the guest page frame real address (PFRA) 326 is translated using the host DAT structures (e.g., DAT structures 384) to obtain the host page frame real address (PFRA) 374*f*. The host page frame real address is then concatenated with the offset of the host virtual address, and this translated address is provided to the requestor, STEP 718.

Figure 7B:
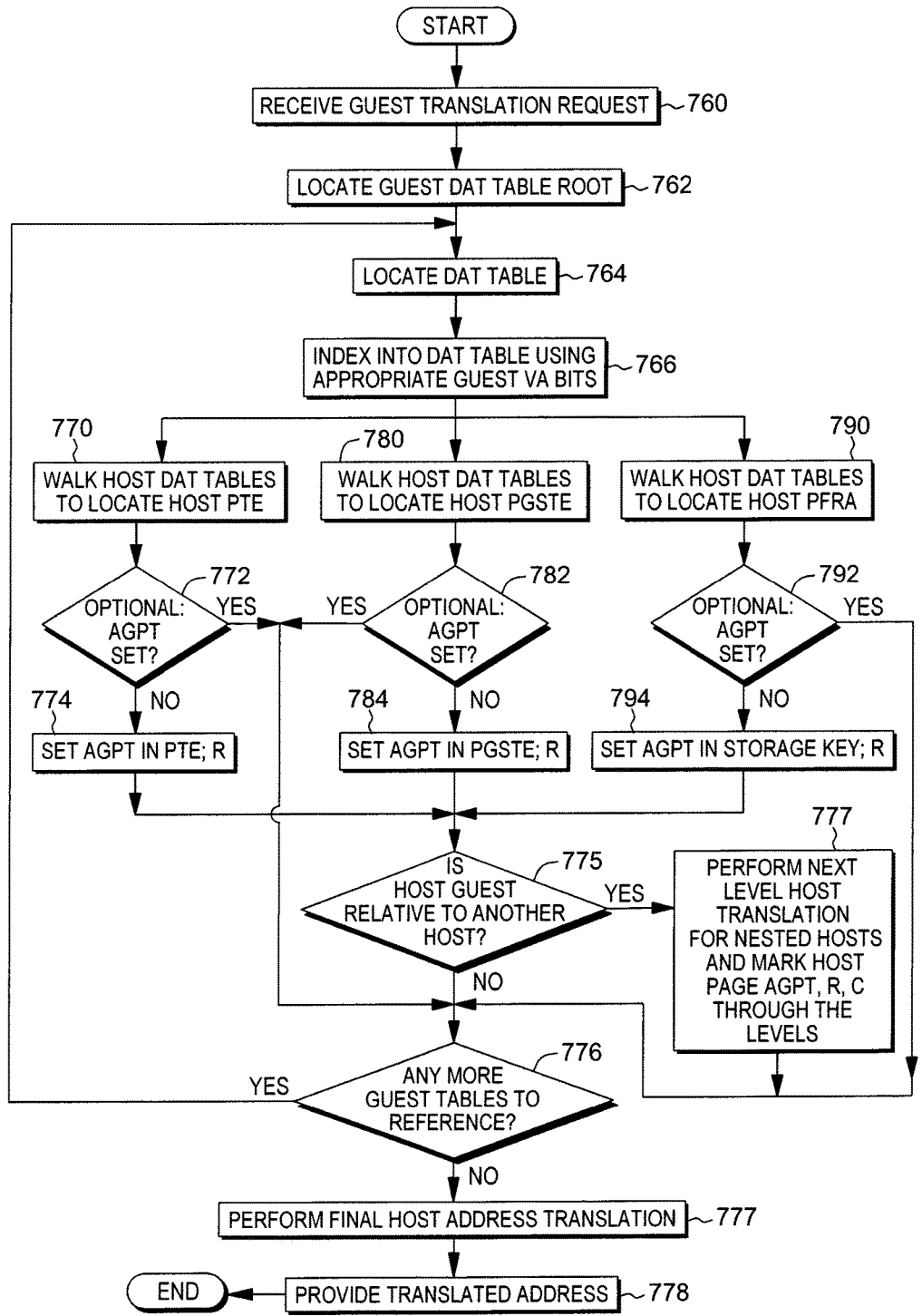
FIG. 7B depicts another example of logic used for marking memory, in accordance with an aspect of the present invention.

Another embodiment of tracking active pages supporting guest page tables is described with reference to FIG. 7B. This logic is performed by a processor.

Initially, the processor receives a guest translation request to translate a virtual address to a real (or absolute) address, STEP 760. Based on receiving the request, a determination is made as to the root of the guest address translation structure, STEP 762. The root is provided, for instance, by the guest address space control element (ASCE) 300. Using the determined root, a guest address translation structure (e.g., DAT table, such as e.g., a region table, a segment table, a page table, etc.) is located, STEP 764. The processor indexes into the guest DAT table using appropriate bits of the guest virtual address (VA) to obtain an entry in the DAT table, as described with reference to FIGS. 3A-3B, STEP 766. For instance, if the DAT table is region first table 306, then RFX 308 of the guest virtual address is used to obtain an entry in the guest region first table (RFT). Then, host address translation 372 is provided for the address of that RFT entry, as described with reference to FIG. 3B, to obtain a host page table entry, a page status table entry, and/or a host real address (PFRA).

Particularly, in one example, the host DAT tables (e.g., host DAT tables 372, in this example) are walked for the address of the indexed guest RFT entry, as described with reference to FIG. 3B, to locate a host page table entry (PTE), STEP 770. A determination is made as to whether the AGPT is set (e.g., equal to zero) in this entry, INQUIRY 772. If it is not set, it is set, as well as a reference indicator (R) (e.g., in the host page table entry, the corresponding PGSTE and/or the storage key), STEP 774, and processing continues to INQUIRY 775. Otherwise, if it is already set, processing continues to INQUIRY 776. Optionally, INQUIRY 772 can be bypassed and the AGPT and reference bits can be set (e.g., equal to zero and one, respectively), STEP 774, regardless of their current values.

In a further example, the host DAT tables (e.g., host DAT tables 372, in this example) are walked for the address of the indexed guest RFT entry to locate a host page status table entry (PGSTE), STEP 780. For instance, the DAT tables are walked to locate the page table entry and from there the page status table entry is located. A determination is made as to whether the AGPT is set (e.g., equal to zero) in this entry, INQUIRY 782. If it is not set, it is set, as well as a reference indicator (R) (e.g., in the host PTE, the corresponding PGSTE, and/or the storage key), STEP 784, and processing continues to INQUIRY 775. Otherwise, if it is already set, processing continues to INQUIRY 776. Optionally, INQUIRY 782 can be bypassed and the AGPT and reference bits can be set (e.g., equal to zero and one, respectively), STEP 784, regardless of their current values.

In yet a further example, the host DAT tables (e.g., host DAT tables 372, in this example) are walked for the address of the indexed guest RFT entry to locate a host page frame real address (PFRA) 374a, STEP 790. For instance, the DAT tables are walked to locate the page table entry and the host page frame real address is obtained therefrom. The host page frame real address is used to locate a corresponding storage key, and a determination is made as to whether the AGPT is set (e.g., equal to zero) in the storage key, INQUIRY 792. If it is not set, it is set, as well as a reference indicator (R) (e.g., in the host PTE, the corresponding PGSTE, and/or the storage key), STEP 794, and processing continues to INQUIRY 775. Otherwise, if it is already set, processing continues to INQUIRY 776. Optionally, INQUIRY 792 can be bypassed and the AGPT and reference bits can be set (e.g., equal to zero and one, respectively), STEP 794, regardless of their current values.

At INQUIRY 775, a determination may be made as to whether this host is a guest relative to another host. If so, the next level host translation is performed for the nested hosts, and the AGPT and reference indicator (R) through the host levels are set, as described above, STEP 777. Further, the change indicator (C) is set through the host levels, as appropriate changes are made to the entries. Processing continues to INQUIRY 776. However, if this host is not guest relative to another host, then processing continues at INQUIRY 776.

At INQUIRY 776, a determination is made as to whether there are any more guest translation tables to be referenced. If so, translation continues with the next level of DAT table (e.g., a region second table 310 if the root was a region first table, as shown in FIGS. 3A-3B), STEP 764. Otherwise, final host address translation is performed, as described in FIG. 3B, STEP 777. For instance, the guest page frame real address (PFRA) 326 is translated using the host DAT structures (e.g., DAT structures 384) to obtain the host page frame real address. The host page frame real address (PFRA) 374f is then concatenated with the offset of the host virtual address, and this translated address is provided to the requestor, STEP 778.

As described herein, in accordance with one or more aspects, storage keys, host page table entries and/or page status table entries are extended to indicate guest use for active page table translation. In one or more aspects, the guest page table walk is extended to mark a storage key, a host PTE and/or PGSTE to indicate it is to be in guest use for active DAT table translation when a page is referenced during a guest DAT table walk. In one embodiment, this scheme does not require the guest to execute new instructions to mark a page as backing guest DAT tables and inform the hypervisor of this use of this page. In a multi-level guest/host relationship, the pages are recursively marked, so that each host is aware of the original active guest DAT table use.

In another example, the host page may be marked only if it backs specific guest DAT tables (e.g., guest segment and region tables but not guest page tables). In another example, multiple marks are provided to distinguish between host pages that back one type or group of types of guest DAT tables (e.g. guest segment or region tables) from those that back another type or group of types of guest tables (e.g. guest page tables). The specifics of these refinements could be based on the structure and implementation of the hierarchical TLB or on the DAT management algorithm used by the guest and/or host operating system. Other variations also exist.

In one aspect, only host pages that are in active use, that is, are actively being referenced by the guest, are marked, rather than all pages of a potentially large guest DAT table in which many pages may be inactive. This indicates a working set of active DAT tables, rather than all DAT tables, and enables the hypervisor to page-out invalid guest DAT table sections without requiring any of the interlocks required to page-out active page tables (DAT entries). Further, aspects of the present invention may be employed in conjunction with unmodified guest operating systems using paging, e.g., older operating system versions or operating systems that have not been extended to use an alternate instruction-based notification mechanism.

Figure 8A:
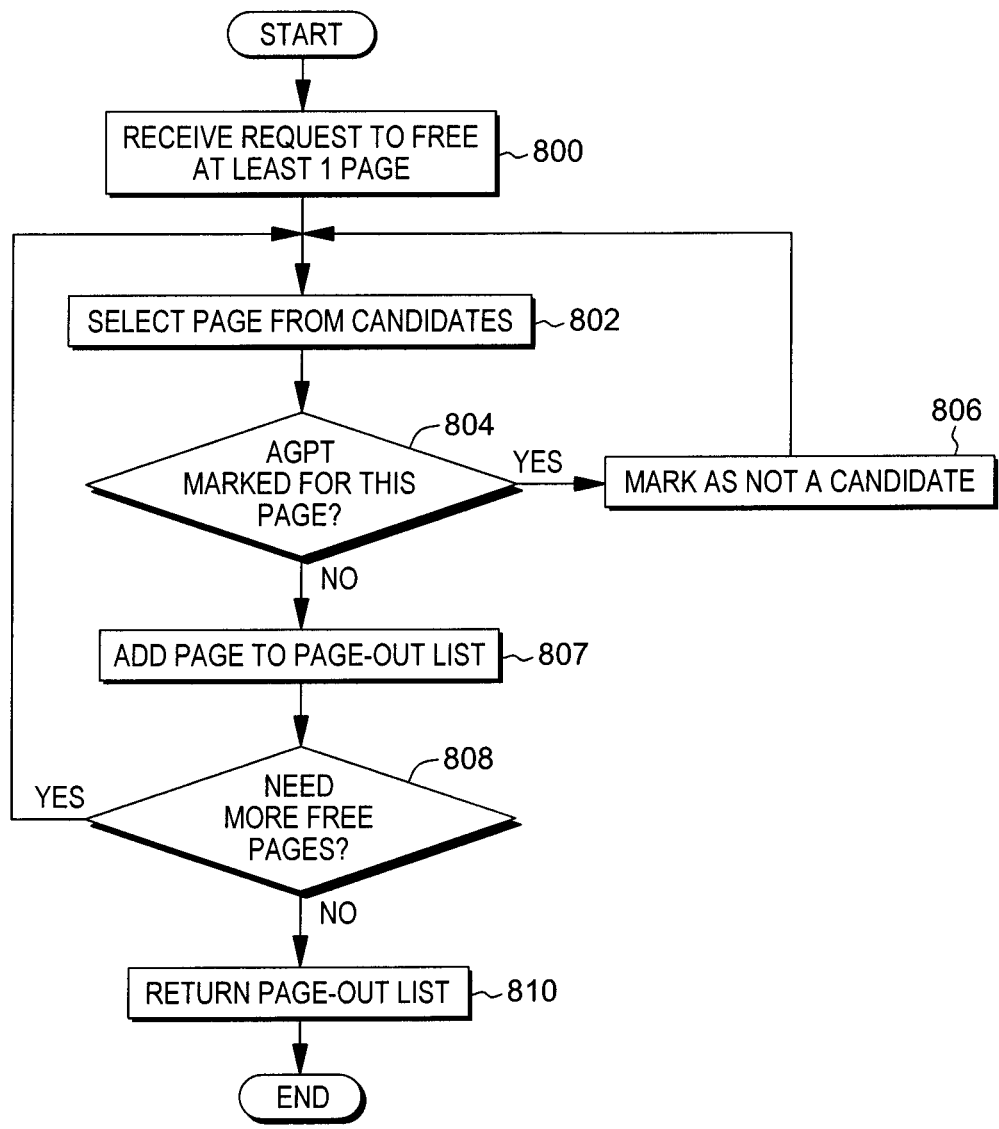
FIG. 8A depicts one example of logic for host-based page-out selection, in accordance with an aspect of the present invention.

In yet a further aspect, the AGPT indicators are used in memory management. For instance, memory management actions, such as paging-out of memory, are performed based on the AGPT indicators. One embodiment of host-based page-out selection logic is described with reference to FIG. 8A. In one example, this logic is performed by a virtual machine manager, such as a hypervisor or a host program, as examples.

Initially, a request is received by a virtual machine manager, e.g., from a program, other virtual machine, etc., to free at least one block of memory, STEP 800. In this example, the block of memory is a page of memory, but in other examples, the block may be other sizes. A page to be freed is selected from a set of candidate pages, STEP 802. A determination is then made, in accordance with an aspect of the present invention, of whether the AGPT is marked for the selected page to be freed, INQUIRY 804. That is, the AGPT in an associated storage key, host PTE, PGSTE or other location is checked. If it is marked (e.g., AGPT=0), then the page is marked as not a candidate for paging-out by the host, STEP 806, and processing continues to STEP 802. That is, the page is marked as not being available for further use (i.e., not free) by, e.g., a host or another guest. In another embodiment, there is no marking of non-candidacy; instead, no indication is provided—the page is just not placed on a page-out list (also known as a free list).

Returning to INQUIRY 804, if the AGPT is not marked for this page (e.g., AGPT=1), then it is added to a page-out list, STEP 807, and a determination is made as to whether more pages are to be freed, INQUIRY 808. If more pages are to be freed, then processing continues to STEP 802. Otherwise, the page-out list is returned, STEP 810. The returned page-out list includes a list of one or more potential blocks of host memory that may be used for paging operations, and/or to make memory available for further use. As examples, the further use includes reclaiming a block of memory for use by a host, another guest and/or the same guest.

Figure 8B:
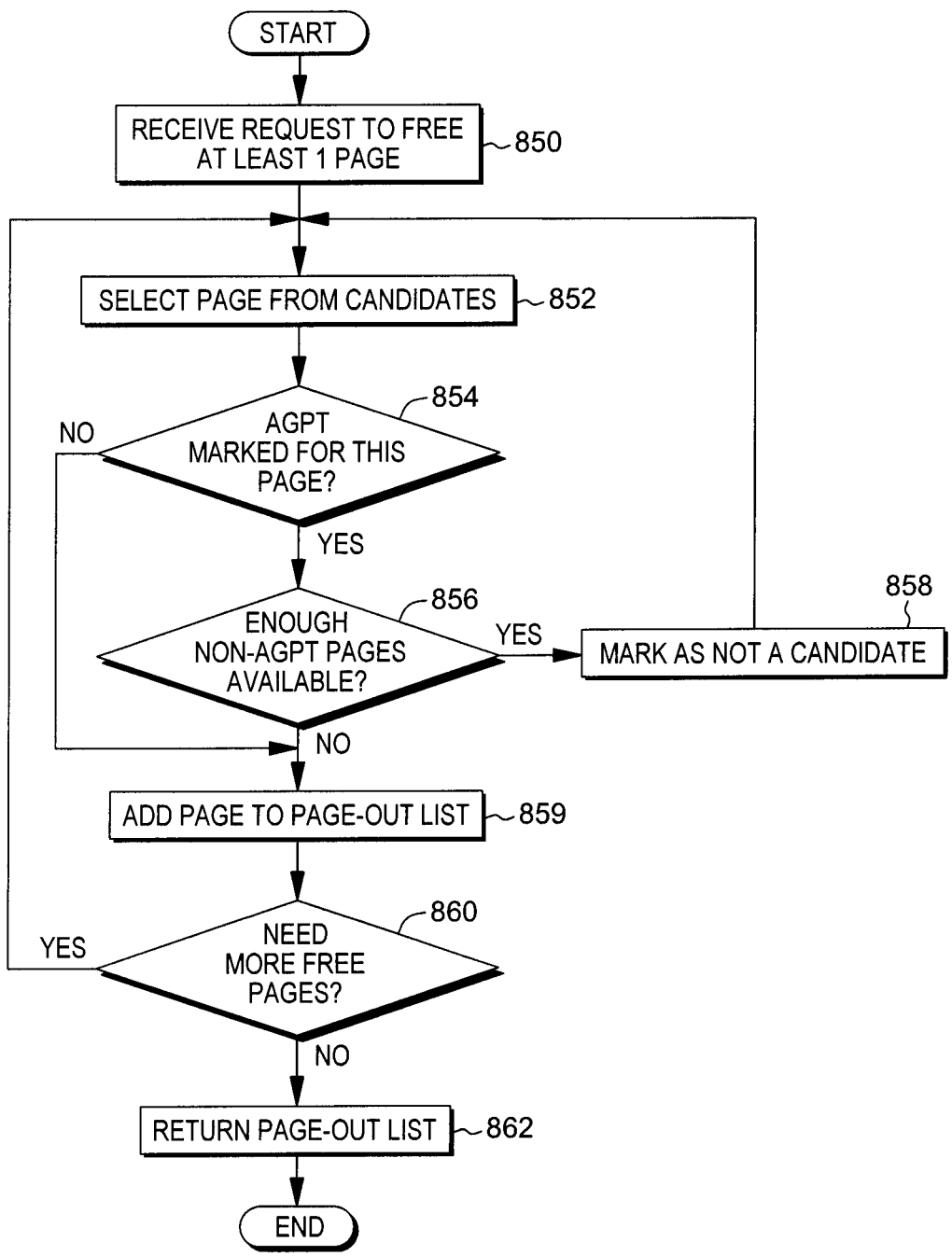
FIG. 8B depicts another example of logic for host-based page-out selection, in accordance with an aspect of the present invention.

Another embodiment of host-based page-out selection logic is described with reference to FIG. 8B. Initially, a request is received by a virtual machine manager to free at least one block of memory (e.g., one page), STEP 850. A page to be freed is selected from a set of candidate pages, STEP 852. A determination is then made, in accordance with an aspect of the present invention, of whether the AGPT is marked for the selected page, INQUIRY 854. If it is marked, then, in this embodiment, a further determination is made as to whether there are enough non-AGPT pages available to be freed, INQUIRY 856. The determination of enough may be based on, for instance, an absolute number, number of present requests, a fraction of total pages, a multiple of current requests, etc. If there are enough non-AGPT pages, then the page is marked as not being a candidate for paging out by the host, STEP 858, and processing continues to STEP 852.

However, if there are not enough non-AGPT pages, INQUIRY 856, or if the AGPT is not marked for this page, INQUIRY 854, then it is added to a page-out list, STEP 859, and a determination is made as to whether more pages are to be freed, INQUIRY 860. If more pages are to be freed, then processing continues to STEP 852. Otherwise, the page-out list is returned, STEP 862.

By checking the AGPT indicators in selecting the blocks of memory to be freed, those blocks of memory backing guest address translation structures may not be freed, and therefore, fewer TLB entries may need to be purged.

In a further aspect, the setting of the AGPT is facilitated, e.g., when a DAT table is created, by using an instruction, referred to herein as an Extract and Set Storage Attributes (ESSA) instruction. The Extract And Set Storage Attributes instruction is valid for pageable guests, and in one example is executed at the request of a guest and without intervention by the host.

Figure 9A:
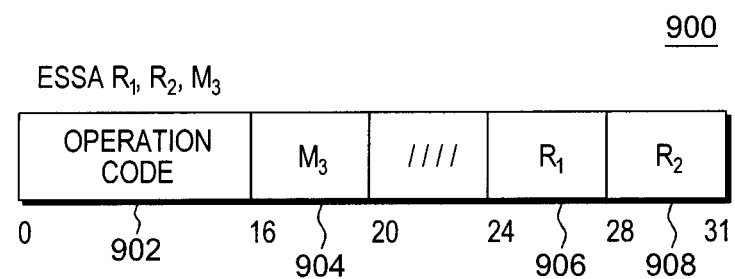
FIG. 9A depicts one example of an Extract And Set Storage Attributes (ESSA) instruction, in accordance with one or more aspects of the present invention.

One example of a format of an ESSA instruction is described with reference to FIG. 9A. An Extract And Set Storage Attributes (ESSA) instruction 900 includes an operation code 902 specifying that this is an ESSA operation; an $M_3$ field 904 indicating the operation to be performed; a designation 906 ($R_1$) for an output register into which the guest block states, the host block states, and the AGPT are extracted; and a designation 908 ($R_2$) for an input register which designates the guest absolute address of the block of memory for which the block states and the AGPT are to be extracted and optionally set, per the operation code. With this instruction, the block usage state (e.g., the guest state), the block content state (e.g., the host state), and the AGPT of the block designated by the second operand (e.g., the register specified in $R_2$) are extracted into the first operand location (e.g., the register specified by $R_1$). The block usage state, the block content state, and/or the AGPT indicator may optionally be set (e.g., in the host PTE, the PGSTE, and/or the storage key) based on the value of the $M_3$ field. Asynchronous to the execution of the instruction, the block usage state, the block content state, and/or the AGPT indicator may be changed.

In operation, a plurality of bits of the general purpose register designated in $R_2$ specifies a block in absolute storage (e.g., a 4K-byte block), and when the instruction completes, the general register designated by the $R_1$ field contains the guest block usage state, the host block content state, and the AGPT indicator of the designated block before any specified state change is made.

Figure 9B:
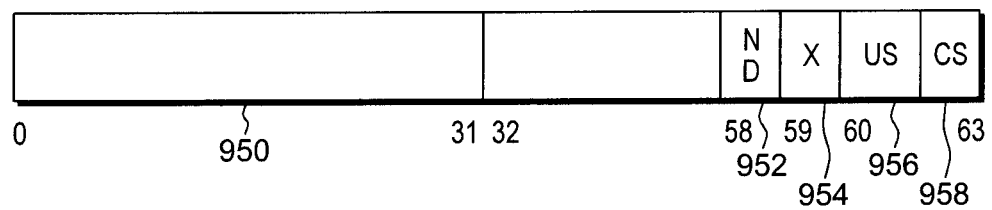
FIG. 9B depicts one example of fields of a register specified by the Extract And Set Storage Attributes instruction of FIG. 9A, in accordance with one or more aspects of the present invention.

One example of a format of the register specified by the $R_1$ field is depicted in FIG. 9B.

In one example, the register specified by $R_1$ includes the following information:

Unused (bits 0-57) 950: These bits are unused, in this example;

Block No-DAT Indication (ND, bit 58) 952: In accordance with an aspect of the present invention, when this indicator is zero, the block may be used for guest dynamic address translation tables (AGPT is set for this block); and when the indicator is one, the block does not contain guest dynamic address translation tables (AGPT is not set for this block).

Exception Indication (X, bit 59) 954: When an enhanced DAT facility 1 is installed, this field is an exception indication. When the exception indication is zero, the operation specified by the operation request code was successfully completed. When the exception indication is one, the states of the block are returned, however, the operation specified by the operation request code is not successfully completed; and the operation completes without changing the block content state or the block usage state. This indicator is set to one, when the following conditions apply:

The block usage and content state are stable and resident, respectively;

An attempt is made to set a non-stable state.

Block Usage State (US, bits 60-61) 956: This field includes a code value indicating the guest block usage state of the designated block. Example block usage states include:

Stable State (S)

Unused State (U)

Potentially Volatile State (P)

Volatile State (V)

Block Content State (CS, bits 62-63) 958: This field includes a code value indicating the host block content state of the designated block. Example block content states include:

Resident State (r)

Reserved

Preserved State (p)

Logically Zero State (z)

Returning to FIG. 9A, the $M_3$ field designates an operation request code specifying the operation to be performed. Example operations that may be performed include:

Extract Block Attributes: The current block usage state, the block content state, and the AGPT of the designated block are extracted. No change is made to the states.

Set Stable State: The current block usage state, the block content state, and the AGPT of the designated block are extracted. Following extraction, the block usage state is set to the stable state (S); and in accordance with an aspect of the present invention, the AGPT indicator is set (e.g., to zero), in, e.g., one or more data structures.

Set Unused State: The current block usage state, the block content state, and the AGPT of the designated block are extracted. Following extraction, the block usage state is set to the unused state (U). Further, if the block content state is the preserved state (p), the contents of the block are discarded, and the block content state is set to the logically zero state (z).

Set Volatile State: The current block usage state, the block content state, and the AGPT of the designated block are extracted. Following extraction, the block usage state is set to the volatile state (V). Also, if the block content state is the preserved state (p), the contents of the block are discarded, and the block content state is set to the logically zero state (z).

Set Potentially Volatile State: The current block usage state, the block content state, and the AGPT of the designated block are extracted. Following extraction, the following occurs:
  (1) If the block content state is the resident state (r), the block usage state is set to the potentially volatile state (P).
  (2) If the block content state is the preserved state (p) and the change bit for the designated block is one, the block usage state remains the stable state (S) and the block content state remains the preserved state.
  (3) If the block content state is the preserved state (p) and the change bit for the designated block is zero, the contents of the block are discarded, and the block usage state is set to the volatile state (V), and the block current state is set to the logically zero state (z).
  (4) If the block content state is the logically zero state (z), the block usage state is set to the volatile state (V).

Set Stable and Make Resident: The current block usage state, the block content state, and the AGPT of the designated block are extracted. Following extraction, the block contents are made resident and the block state is set to the stable state (S), and the block content state is set to the resident state.

Set Stable If Resident: The current block usage state, the block content state, and the AGPT of the designated block are extracted. Following extraction, the block usage state is set to the stable state (S), if the block content state is the resident state (r).

Set Stable and Set No-DAT: The current block usage state, the block content state, and the AGPT of the designated block are extracted. Following extraction, the block usage state is set to the stable state, and in accordance with an aspect of the present invention, the AGPT indicator is cleared (e.g., set to one) in, e.g., one or more data structures.

In one example, when the $M_3$ code indicates an indicator, such as the AGPT, is to be set, it is set in one or more selected locations, such as in one or more of the host page table entry, a page status table entry, a storage key or other defined location.

Figure 10:
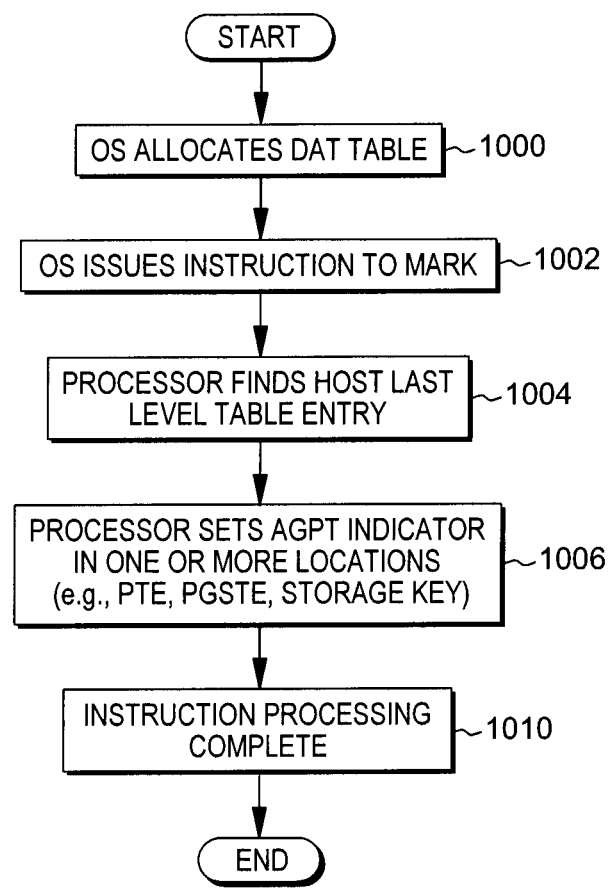
FIG. 10 depicts one example of using the ESSA instruction to mark memory, in accordance with an aspect of the present invention.

One embodiment of using the ESSA instruction to perform marking is described with reference to FIG. 10. In one example, a guest control program, such as an operating system (OS), allocates an address translation table, such as a DAT table (e.g., a page table, a segment table, a region table, etc.), STEP 1000. Further, the guest control program issues the ESSA instruction and marks that the specified guest block holds a DAT table, STEP 1002. Based on executing the instruction with the proper indication, the processor locates e.g., using the block address provided in the instruction, the host last level table entry (e.g., PTE), STEP 1004. As an example, this is provided by performing a page table walk using the provided address. Other examples are also possible.

Thereafter, the processor sets the AGPT in one or more locations, STEP 1006. For instance, it indexes into the host page table using the host translation of the block address provided in the second operand and sets the indicator in the host page table entry (PTE). In further examples, it locates the page status table based on the location of the page table, and sets the indicator in the page status table entry (PGSTE); and/or it sets the indicator in the storage key associated with the host page frame real address (PFRA) stored in the PTE. Further, the processor may set the indicator in other selected locations. The ESSA processing is complete, STEP 1010.

As described herein, a selected data structure, e.g., a host page table entry, a page status table entry (i.e., an entry associated with a given address translation structure), or a storage key is marked with an indicator indicating whether or not the block of memory (e.g., page) is backing a guest address translation structure, such as a page table, a segment table, a region table, and/or any other table used for address translation.

With this marking, in accordance with a further aspect of the present invention, the scope of invalidating or purging associated translation structures, such as translation look-aside buffers (TLBs), may be selectively limited, as described herein. Again, a TLB is only one example.

When a hypervisor runs a large number of virtual machines or runs virtual machines that use a lot of memory, host paging of guest absolute memory is used in order to support the virtual memory spaces for the virtual machines. For example, a guest page may be assigned a physical host page frame but the host will page out that page so that it may assign it to another guest page. This paging is accomplished by invalidating one or more host dynamic address translation table entries (e.g., page table entries, segment table entries and/or region table entries). If the page has been changed, the page (depending on the guest block usage state as described above) may be written to auxiliary storage.

When a DAT table entry is invalidated, any associated TLB entries are purged on all physical central processing units (pCPUs) on which the hypervisor has run. This is done for a number of reasons including, for instance, there may be multiple physical CPUs which contain host or composite guest TLB entries whose contents were formed using the now invalidated host DAT table entry. These entries can no longer be used (now or in the future) to access the page (or other block of memory) being paged out. Further, since there are multiple levels of address translation (e.g., guest/host translation) and limited host information is saved in the guest TLB entry, when a hypervisor page is invalidated, it may be unknown if the host page being invalidated was used in the creation of any given guest TLB entry. Based on this, typically, all guest level TLB entries are purged on any hypervisor DAT table entry invalidate. This over-purging may create a large performance degradation due to DAT tables having to be re-walked for all guest translations, even those that were not truly dependent on the hypervisor invalidation.

However, in accordance with an aspect of the present invention, if it is known that the hypervisor translation being invalidated does not back a guest translation data structure (as indicated by, e.g., the marking described above), then only the guest TLB entries which implicitly include the final host translation are to be purged. This results in a higher TLB hit rate or partial hit rate. If there is a miss, it may take less time to re-walk the DAT tables to create a new entry. The hypervisor can signal to the processor that the hypervisor entry being purged does not back a guest DAT table, and therefore, the machine does not need to purge all of its guest TLB entries.

Figure 11A:
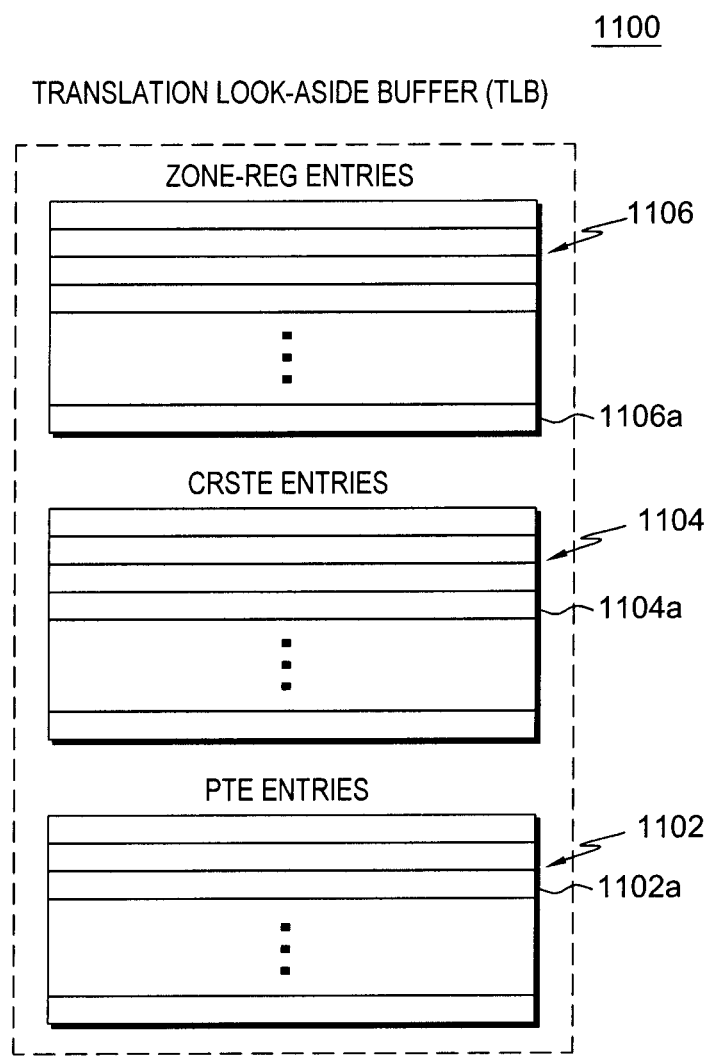
FIG. 11A depicts one example of a translation look-aside buffer (TLB)

In one example, a guest hierarchical TLB includes multiple levels of entries, as described with reference to FIG. 11A. For instance, a translation look-aside buffer 1100 includes a plurality of levels of entries 1102 and 1104. As examples, level 1102 includes one or more page table entries 1102a of a page table; and level 1104 includes one or more combined region and segment table entries (CRSTE) 1104a of a combined region and second table. Each level of entries is, for instance, an n-way set associative array, and each array includes one or more entries 1102a, 1104a, respectively. Each entry includes address translation information based on translating a guest virtual address. Although in the embodiments herein, there are two levels of entries, in other embodiments, there may be more or fewer than two levels. Also, the levels may be different than the example levels described herein.

Additionally, in one example, TLB 1100 includes a zone-register file (zone-reg) 1106 that includes one or more entries 1106a, in which one of those entries is an active entry associated with the active vCPU_ID (i.e., guest). The zone-register file is an n-way set associative array, which includes the one or more entries 1106a. In a further example, in addition to the active guest entry, the zone-register file includes another entry associated with a host managing the guest. The host has its own vCPU_ID. As examples, a vCPU_ID of zero is a host id, and a vCPU_ID of non-zero is a guest id. Therefore, the vCPU_ID may be used as a guest/host indicator.

Figure 11B:
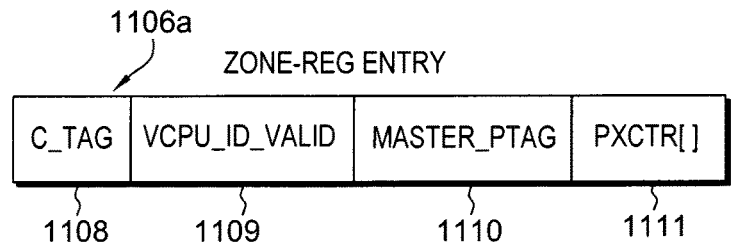
FIG. 11B depicts one example of an entry of the zone register of FIG. 11A, in accordance with an aspect of the present invention.

Referring to FIG. 11B, each zone reg entry 1106a includes, for instance, a CRSTE tag (c_tag) 1108, a vCPU_ID valid indicator (vCPU_ID_VALID) 1109, and in accordance with an aspect of the present invention, an array of counters PXCTR[ ] 1111, and optionally, a master p_tag 1110. To locate an entry in the zone register file, the vCPU_ID is used as an index into the register file. In other embodiments, each entry may include more, less and/or different information than described herein. A new zone-reg entry is created when a guest virtual translation is requested and the vCPU_ID valid indicator is off. When a new entry is written, the entry is set to valid (e.g., vCPU_ID VALID indicator 1109 is set to one) and c_tag counter 1108 is incremented. In accordance with an aspect of the present invention, all entries in the array of p_tag counters PXCTR[ ] 1111, and optionally, the master p_tag 1110 are set to zero.

In accordance with an aspect of the present invention, an array of p_tag counters (PXCTR[ ]) 1111 is associated with each zone reg entry (i.e., one array per vCPU_ID). The array of p_tag counters includes one or more counters used to determine which PTE entries of a TLB are invalid. In one example, the array of p_tag counters is indexed by a variable i, which is a value based on the virtual address. With an array of p_tag counters, subsets of PTE entries may be purged. A subset is selected based on the virtual address, or more specifically the variable i determined by the virtual address, associated with the purge request. The purge is accomplished by incrementing a particular counter value or values causing compares with a p_tag counter 1132 in the PTE 1102a to fail, as described herein.

Figure 3B:
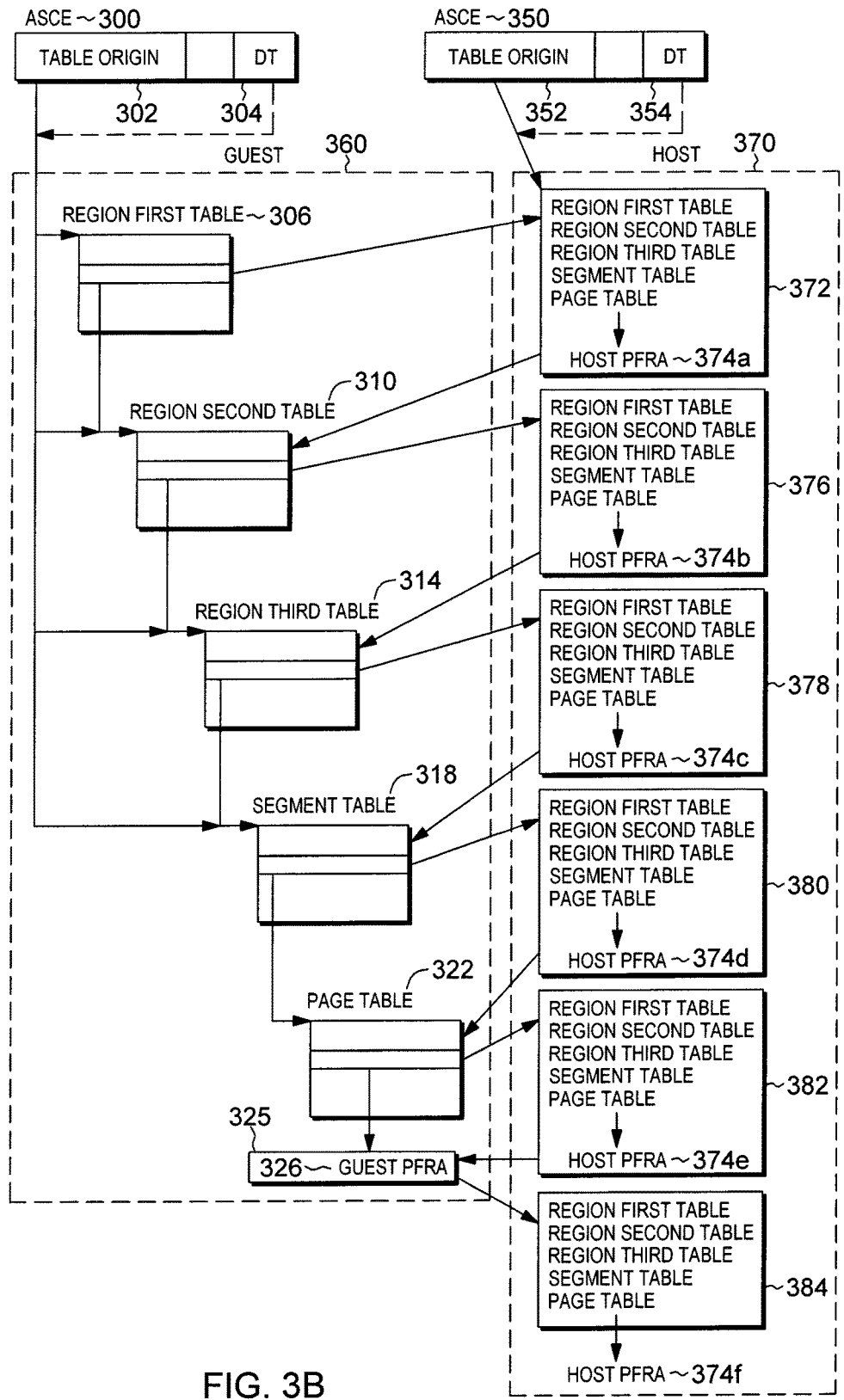
FIG. 3B depicts another example of address translation.
Figure 11C:
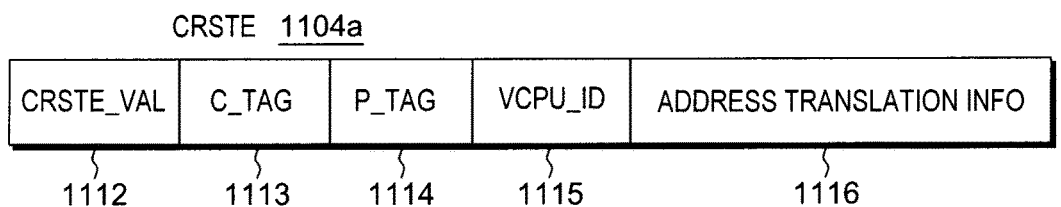
FIG. 11C depicts one example of a combined region and segment table entry (CRSTE) of the translation look-aside buffer of FIG. 11A.

As one example, a CRSTE entry 1104a is created for a given guest virtual address by walking the guest DAT tables (e.g., region and segment tables 306, 310, 314 and 318 from FIG. 3B) and using host translations to obtain guest DAT table entries and finally determining the origin of the next DAT table (e.g., guest page table 322 from FIG. 3B). In one example as described in FIG. 11C, CRSTE 1104a includes a CRSTE_val indicator 1112 to indicate if the entry is valid, a CRSTE tag (c_tag) 1113 that is compared with c_tag 1108 from the active zone_reg entry to determine if this CRSTE entry is valid; a PTE tag (p_tag) 1114 that is a counter incremented each time a purge is to be performed for this level of TLB; a vCPU_ID 1115, which is an identifier for the current vCPU (the current guest) for this entry; and address translation information 1116 obtained from the guest DAT tables walk (e.g., from one or more region tables and/or segment table). This address translation information may include, for example, the guest page table origin (PTO) associated with the initial guest virtual address.

Figure 11D:
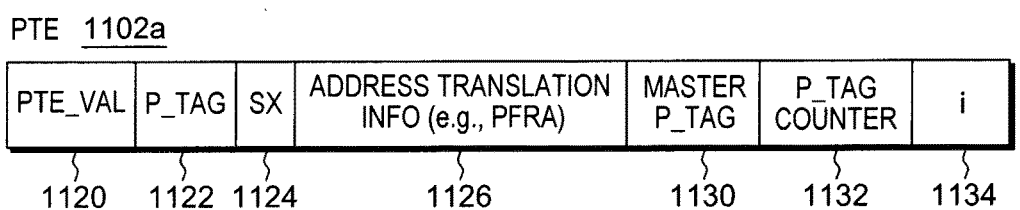
FIG. 11D depicts one example of a page table entry (PTE) of the translation look-aside buffer of FIG. 11A, in accordance with an aspect of the present invention.

Further, as shown in FIG. 11D, an associated PTE entry 1102a includes, for instance, a validity indication (PTE_val) 1120; a PTE tag (p_tag) 1122, which is compared to p_tag 1114 in the associated CRSTE entry; the segment index (SX) 1124 of the virtual address or a portion of the SX; and address translation information 1126 obtained from the last guest DAT table walk (i.e. from the guest page table), and the final host translation (i.e., the translation of the guest real or absolute address to the final host real or absolute address), including, for instance, the host page frame real address. Further, in accordance with an aspect of the present invention, PTE entry 1102a optionally includes a master p_tag 1130, which is compared to master p_tag 1110 in the zone-reg file to determine if the PTE entry is valid for this translation.

Additionally, in accordance with an aspect of the present invention, p_tag counter 1132 is provided. The p_tag counter is selected from PXCTR counter array 1111 in zone-reg entry 1106a, for example, associated with this vCPU_ID. The entry selected is based on a variable i 1134 of PTE 1102a, which corresponds, for example, to the virtual address associated with this PTE entry.

Each of the master p_tag and/or array of p_tag counters limits the number of TLB entries purged. For instance, the master p_tag causes TLB PTE entries to be purged, but not other levels of TLB entries; the array of p_tag counters provides further granularity enabling the purging of subsets of PTE entries, such that one or more subsets of current PTE entries may not be purged.

Figure 12:
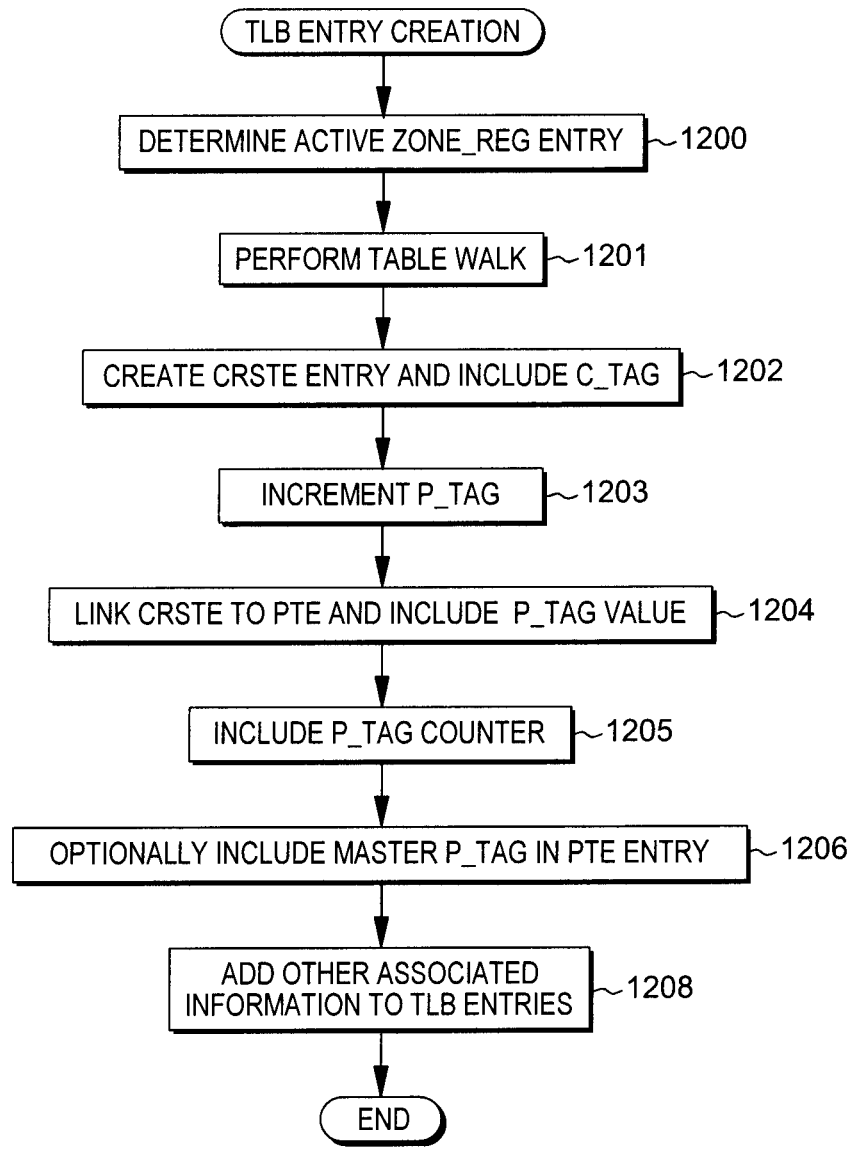
FIG. 12 depicts one example of creating an entry within the TLB, in accordance with an aspect of the present invention.

One embodiment of logic used to create a TLB entry is described with reference to FIG. 12. In one example, the entry in zone-register file 1106 that is the active zone_reg entry is determined using the vCPU_ID, STEP 1200. Next, a DAT table walk is performed for a particular guest virtual address, STEP 1201. During this walk, entries are created in the TLB. For instance, in walking the guest region and/or segment tables, a guest CRSTE entry is created, and included within the CRSTE entry is various information, including c_tag 1113, STEP 1202. C_tag 1113 is set equal to the value of c_tag 1108 from active zone-reg entry 1106a; and p_tag 1114 in CRSTE 1104a is incremented, STEP 1203. Further, the guest CRSTE entry is linked to a guest PTE, which is also created while performing the DAT walk for the guest virtual address; and this PTE includes p_tag 1122, which is set equal to p_tag 1114 from CRSTE 1104a, STEP 1204. Additionally, i 1134, based on the virtual address corresponding to this PTE entry, and p_tag counter 1132, equal to the value of PXCTR[i] from the active zone-reg entry, is included in the PTE entry of the TLB, STEP 1205. Optionally, master p_tag 1110 is copied from the active zone-reg entry and placed in PTE 1102a as master p_tag 1130, STEP 1206. Further, any other associated information 1126 is added to the TLB entries, at least some of which is described above, STEP 1208. Although the TLB entries are described herein with particular information, the entries may include more, less and/or different information in other embodiments.

When a translation request is received for a virtual address, the processor first determines whether one or more entries exist in the TLB for the virtual address. If there are entries for the virtual address, and thus, a TLB hit, the TLB entries are used to obtain the translated address. Otherwise, there is a TLB miss, and a DAT walk is performed for the virtual address. Since, in one example, the TLB has multiple levels, there may be a hit in one level, such as the CRSTE level and not in another level, such as a PTE level. In such a case, there is a partial TLB hit, and only a partial DAT walk is performed for the virtual address. One embodiment of processing associated with determining whether there is a TLB hit for a guest virtual address is described with reference to FIG. 13A. This logic is performed, e.g., by a processor.

Figure 13A:
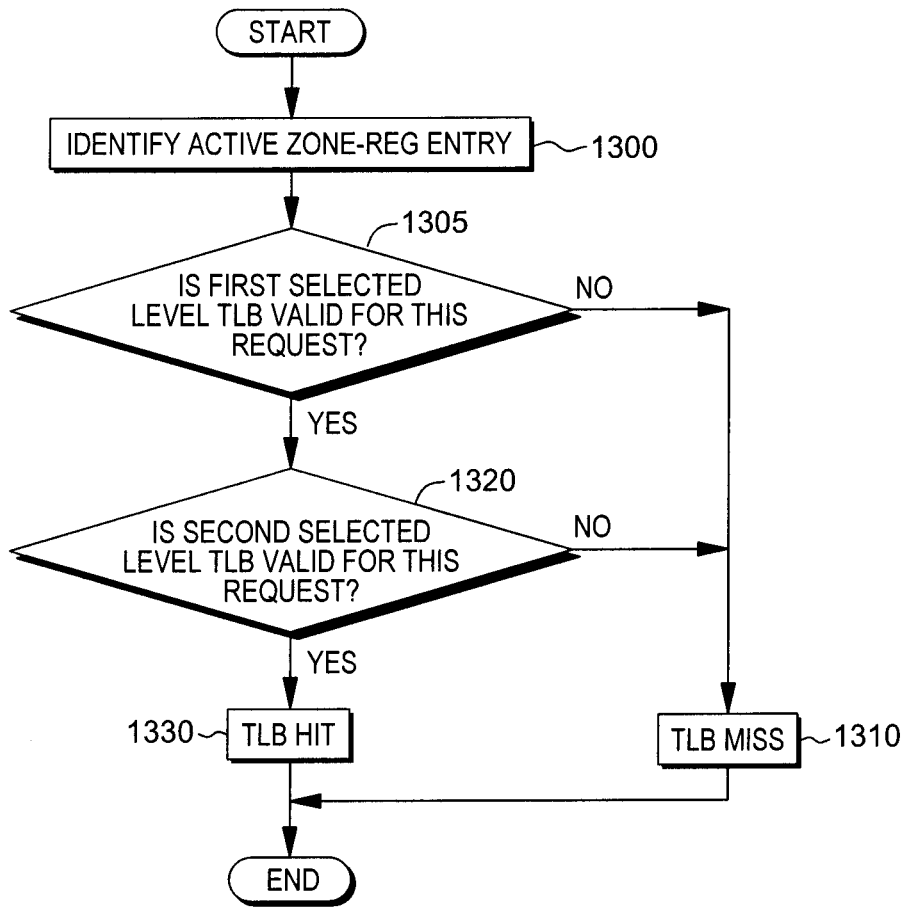
FIG. 13A depicts one example of logic to perform TLB matching to determine whether an entry exists in the TLB for a particular guest virtual address, in accordance with an aspect of the present invention.

Referring to FIG. 13A, initially, in one example, a request for a TLB look-up is received for a particular guest virtual address, and based thereon, an active zone-reg entry is identified for this request based on the vCPU_ID, STEP 1300. Further, a determination is made as to whether a valid entry exists in a first selected level of the TLB (e.g., the CRSTE level) for this guest virtual address and this vCPU, INQUIRY 1305. This determination includes, for example, a determination of validity of both the active zone-reg entry (vCPU_ID_valid 1109) and the CRSTE entry (CRSTE_val 1112), a compare of the CRSTE vCPU_ID 1115 with the current vCPU_ID, a compare of c_tag 1108 from the active zone-reg entry and c_tag 1113 in the CRSTE entry and compares based on other DAT translation parameters 1116. If a valid entry does not exist in the first selected level of the TLB, then a TLB miss is indicated, STEP 1310.

However, if there is a valid entry in the first selected level of the TLB (e.g., the CRSTE) for the guest virtual address, a further inquiry is made as to whether there is a corresponding valid entry in a second selected level of the TLB (e.g., the PTE level) for the guest virtual address, INQUIRY 1320. The entry is valid for this request if, for example, the PTE val indicator 1120 is on; SX 1124 matches the segment index (SX) of the virtual address of the request; p_tag 1122 matches p_tag 1114 from the CRSTE entry; and compares based on other DAT translation parameters 1126 also match. In accordance with an aspect of the present invention, a successful validity test also includes p_tag counter value 1132 matching the value of PXCTR[i] in a selected location, e.g., the active zone-register. Optionally, an additional compare can be performed to determine if master p_tag 1110 from zone-reg matches master p_tag 1130 in the PTE entry. If any of these comparisons fail, the TLB entry is not valid for this request and a TLB miss is indicated, STEP 1310. Otherwise, if there is an entry with a complete match of the compare values, then a TLB hit is indicated, STEP 1330. (In further embodiments, other matching criteria may be used for a hit/miss determination.)

Thus, in one example, with a multi-level TLB design, where there is a combined entry which has multiple higher level tables combined into one entry, and then another entry which is the last level of the guest translation combined with the host translation, only a subset of the second selected level of the TLB entries (i.e., the PTE entries) may need to be purged. This purge is accomplished by incrementing the p_tag counter and/or, optionally the master p_tag.

Figure 13B:
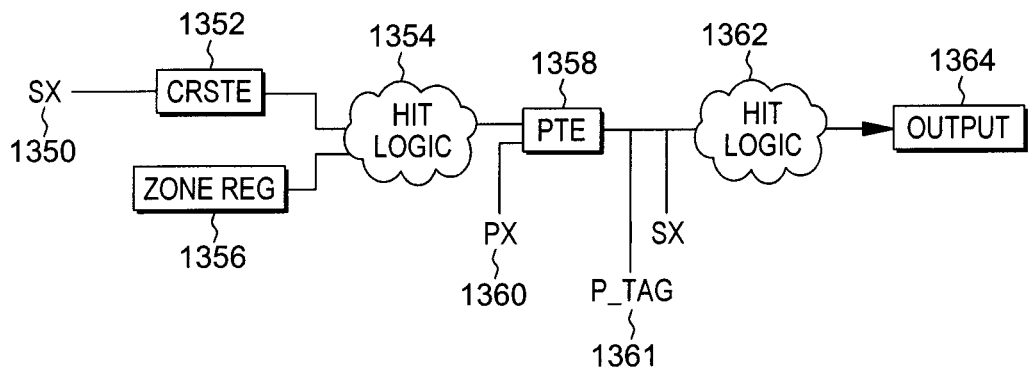
FIG. 13B depicts further details of performing TLB matching to determine whether an entry exists in the TLB for a particular guest virtual address, in accordance with an aspect of the present invention.

Additional details regarding TLB matching are described with reference to FIG. 13B. In this example, a portion of the guest virtual address 1350 (e.g., one or more bits of the SX portion 320 (FIG. 3A)) is input to a CRSTE array 1352 of the TLB to select one or more entries of the CRSTE. The number of entries selected depends on the set associativeness of the CRSTE array. For example, if it is a 4-way set associative array, then four entries are selected. Information included in the selected entries of the CRSTE is forwarded to hit logic 1354, and used to determine whether a valid entry for this guest virtual address is included in the CRSTE. Additionally, information from the active entry of zone register 1356 is input to CRSTE hit logic 1354. Based on input from the CRSTE and the zone register, the hit logic produces a signal indicating whether there is a CRSTE level hit for the guest address. For instance, hit logic 1354 compares the vCPU_ID and c_tag of the CRSTE entries selected based on SX with the active vCPU_ID, used as an index into the zone register, and c_tag from that entry. If the vCPU_ID and c_tag match, then the signal indicates a CRSTE hit.

If there is a CRSTE level hit, then at least a portion of the PX portion 1360 of the guest virtual address is input into a PTE array 1358 to locate one or more entries depending on the associativeness of the array. For instance, if the PTE array is a 6-way set associative array, then 6 entries are selected, and information from those entries is forwarded to PTE hit logic 1362. Further, the SX from the request, and a p_tag 1361 stored in the CRSTE (which may be in the CRSTE entry (e.g., p_tag 1114) or separate therefrom) are input into PTE hit logic 1362.

In the PTE hit logic, the SX from the request and the SX in the PTE entries are compared, as well as the p_tag in the CRSTE 1114 with the p_tag in the PTE entries 1122. Further, the value of the p_tag counter in PTE 1132 is compared with the value of PXCTR[i], in the zone register entry indexed into by vCPU_ID, where i from PTE 1134 in one example is the host PX or a portion of the host PX. If all of the compares indicate a match with one of the entries, then there is a hit, and output 1364 includes, for instance, a page frame real address from the entry with the matching information.

In a further aspect, TLB entries for a guest CPU (e.g., a guest vCPU having a particular vCPU_ID) may be purged based on a host purge request. However, in accordance with an aspect of the present invention, selective purging of the TLB may be performed in that a subset of entries of one selected TLB level is purged instead of all the TLB entries at the one selected level or all of the TLB entries for the guest. This increases performance by enhancing TLB hits or partial hits.

In accordance with one or more aspects, when it is known that a host purge will not be purging the backing page of a guest DAT table, such as a region table, a segment table and/or a page table, it is possible to limit the amount of purging that a TLB performs which will improve guest performance. Based on receiving a host purge request that does not require the first selected level of TLB entries to be purged, the value of PXCTR[i] in the guest zone register entry for any guest related to this host request (e.g., host CPU or configuration) is incremented effectively purging a subset of the second selected level entries, but none of the first selected level entries. For instance, only a subset of TLB entries for the guest at a last level of translation (e.g., PTE level) is to be purged, in one example.

Figure 14:
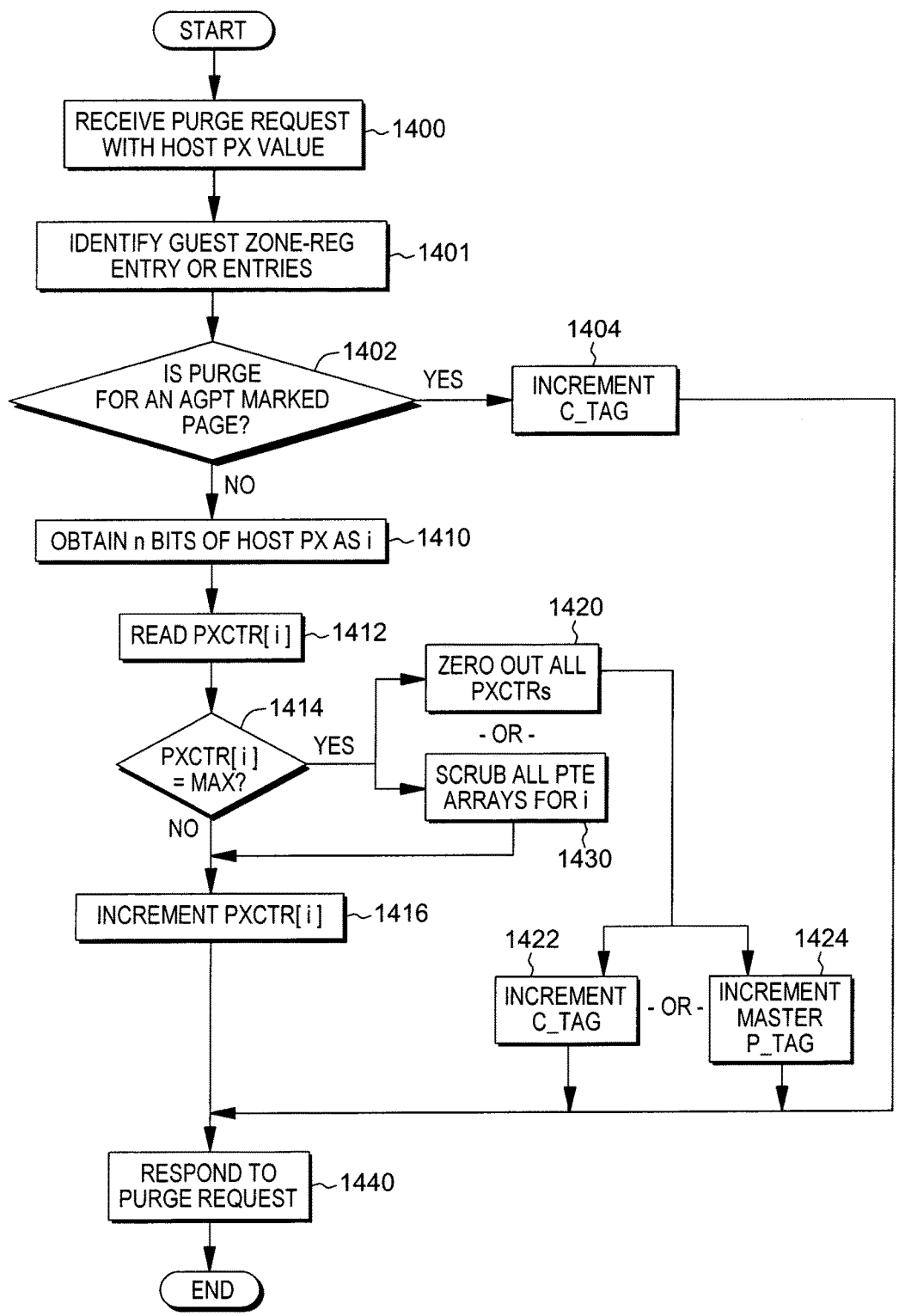
FIG. 14 depicts one example of TLB purge processing, in accordance with an aspect of the present invention.

One embodiment of using the array of p_tag counters, e.g., PXCTR[ ] 1111, in TLB purge processing is described with reference to FIG. 14. Initially, a purge request is processed with a host PX value, STEP 1400. For instance, the processor receives the purge request (e.g., in response to an IPTE instruction issued on this processor or broadcast from another processor) for a block of memory assigned to the guest (e.g., vCPU having a particular vCPU_ID). Based on information sent with the host request, the guest zone-reg entry or entries that are affected by this request are identified, STEP 1401. This identification, in one example, may be performed using a compare of a host configuration ID in each guest zone-reg entry with that of the request. Next, a determination is made as to whether this block of memory for which the purge is requested is backing a guest address translation structure (e.g., region table, segment table, page table), INQUIRY 1402. This may be determined by an AGPT indicator sent with the purge request or determined by the receiving processor (e.g., based on an AGPT indicator stored in a location, such as a storage key, a page status table entry, a host page table entry, etc.); or an AGPT indicator that may be included in the cached TLB entry, as examples. If the purge is for an AGPT marked block of memory (e.g., AGPT=0), then c_tag 1108 in the zone register entry or entries affected by this request is incremented, STEP 1404, effectively purging all TLB entries for this guest. Processing of guest purging associated with this host PTE entry by the receiving processor is then complete.

However, if the purge is not for an AGPT marked entry (e.g., AGPT=1), INQUIRY 1402, then selective purging may be performed of the PTE level of the TLB. For instance, n bits of the PX are obtained as i, where n is, e.g., log base 2 of the size of the array. As a particular example, if PX is 6 bits and n=3, i=6; if n=2, i=2; and if n=1, i=0, etc., STEP 1410. Thereafter, using i as an index into the array of counters PXCTR[ ] in each affected zone register entry, the value of PXCTR[i] is read, STEP 1412. A determination is made as to whether the value of PXCTR[i] is equal to a maximum value, INQUIRY 1414. If it is not equal to a maximum value, then the value of PXCTR[i] is incremented, e.g., by one, STEP 1416. This effectively purges the TLB PTEs having an index i, since any comparison for validity on PTE entries made before the purge will fail. Processing of guest purging associated with this host PTE entry is then complete in the receiving processor, and a response is provided to the purge request, STEP 1440.

Returning to INQUIRY 1414, if the value of PXCTR[i] is equal to a maximum value, then all of the PXCTRs in the corresponding zone register entry are zeroed out, STEP 1420, or the PTE arrays are scrubbed and any PTEs associated with PX=i value are purged, STEP 1430. Processing then continues to STEP 1416, where PXCTR[i] is incremented, and then to STEP 1440, where the response to the purge request is sent and execution is complete.

If the option of zeroing out the PXCTRs is chosen, then subsequent to clearing the counters, either c_tag 1108 in the zone register is incremented, STEP 1422, or master p_tag 1110 in the zone register is incremented, STEP 1424. Then, processing of the guest purging associated with this host PTE entry by the receiving processor is complete, and a response is provided to the purge request, STEP 1440. The selection between incrementing the c_tag or master p_tag is a design choice. If the c_tag is incremented, all of the TLB entries for this guest are cleared, and if the master p_tag is incremented, all TLB PTE entries for this guest are cleared, as examples.

In accordance with a further aspect of the present invention, the AGPT indicators are used in invalidating page table entry processing (or in invalidating other level entries, such as segment table entries, or region table entries, in other embodiments). Details relating to this processing are described with reference to FIGS. 15A-17B. In particular, FIGS. 15A-15E describe one example of an Invalidate Page Table Entry instruction, and FIGS. 16-17B describe aspects of processing associated with the Invalidate Page Table Entry instruction and use of the AGPT indicators.

Figure 15A:
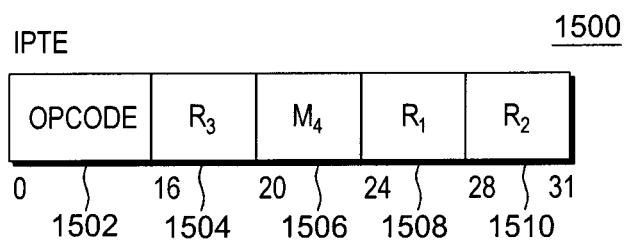
FIG. 15A depicts one example of a format of an Invalidate Page Table Entry (IPTE) instruction, in accordance with an aspect of the present invention.

One embodiment of an Invalidate Page Table Entry instruction is described with reference to FIGS. 15A-15E. Referring initially to FIG. 15A, in one example, an Invalidate Page Table Entry (IPTE) instruction 1500 includes an opcode field 1502 that includes an operation code specifying the invalidate page table entry operation; a first register field ($R_3$) 1504; a mask field ($M_4$) 1506; a second register field ($R_1$) 1508; and a third register field ($R_2$) 1510, each of which is described below.

Figure 15B:
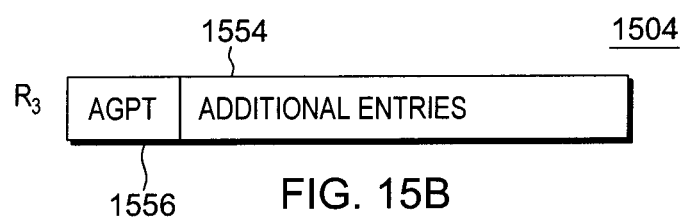
FIG. 15B depicts one example of the contents of a register used by the IPTE instruction of FIG. 15A, in accordance with an aspect of the present invention.

Referring to FIG. 15B, the register specified by register field ($R_3$) 1504 includes a selective purging indicator (AGPT) 1556 that when set (e.g., to one) indicates that none of the host entry or entries being purged were for blocks of memory used to back guest DAT tables. This allows for selective purging of a structure associated with address translation, such that, for example, guest entries which implicitly include only host translations for guest DAT tables do not need to be purged. Further, the register specified by register field 1504 includes an additional entries field 1554 specifying a count (or range) of additional entries, if any, to be invalidated.

Figure 15C:
FIG. 15C depicts one example of the contents of a mask used by the IPTE instruction of FIG. 15A, in accordance with an aspect of the present invention.

Referring to FIG. 15C, mask field ($M_4$) 1506 includes a local clearing control 1560, which can be used, in conjunction with other parameters, to determine if the command is broadcast to all CPUs in the configuration or sent just to the issuing (local) CPU.

Figure 15D:
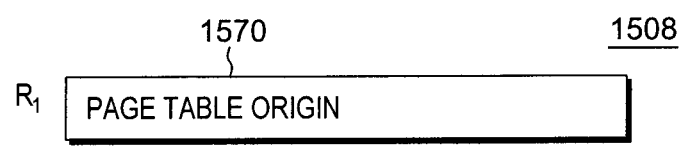
FIG. 15D depicts one example of the contents of another register used by the IPTE instruction of FIG. 15A, in accordance with an aspect of the present invention.
Figure 15E:
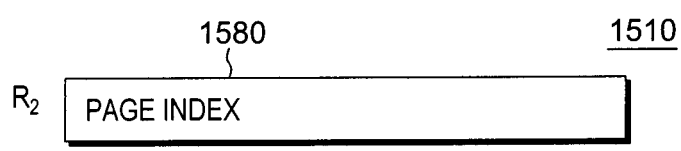
FIG. 15E depicts one example of the contents of yet another register used by the IPTE instruction of FIG. 15A, in accordance with an aspect of the present invention.

With reference to FIG. 15D, second register field ($R_1$) 1508 specifies a register used to indicate a page table origin 1570 of a page of memory to be invalidated; and referring to FIG. 15E, third register field ($R_2$) 1510 specifies a register used to indicate a page index 1580 of a page of memory to be invalidated.

In general operation of IPTE, the designated page table entries are invalidated and the translation look-aside buffers (or other such structures) in the physical processor performing the operation and/or other physical processors in the configuration are cleared of the associated entries. Local clearing control 1560 controls whether only the TLB in the local CPU is cleared or whether the TLBs in all of the CPUs of the configuration are cleared.

In particular, as used herein, the term "specified CPU or CPUs" has the following meaning for the scope of TLBs affected by this instruction, as implemented in the z/Architecture, as one example:

When the local TLB clearing facility is not installed, or when the facility is installed and the local clearing control (LC) bit in the $M_4$ field is zero, the term "specified CPU and CPUs" means all of the CPUs in the configuration.

When the local TLB clearing facility is installed and the LC bit in the $M_4$ field is one, the term "specified CPU or CPUs" means only the CPU executing the IPTE instruction (the local CPU). The TLBs in all other CPUs in the configuration may not be affected.

The designated page table entries are invalidated (e.g., page invalid indicator 404 (FIG. 4) is set to one), and the translation look-aside buffers (TLBs) in the specified CPU or CPUs in the configuration are cleared of the associated entries.

The contents of the general register $R_1$ 1508 have the format of a segment table entry, with only the page table origin 1570 used. The contents of general register $R_2$ 1510 have the format of a virtual address, with only the page index

1580 used. The contents of fields that are not part of the page table origin or page index are ignored.

When the IPTE range facility is not installed, or when the $R_3$ field is zero, the single page table entry designated by the first and second operands (registers specified by $R_1$ and $R_2$, respectively) is invalidated.

When the IPTE range facility is installed and the $R_3$ is nonzero, bits 56-63 of general register $R_3$ (i.e., additional entries 1554) contain an unsigned binary integer specifying the count of additional page table entries to be invalidated. Therefore, the number of page-table entries to be invalidated is 1-256, corresponding to a value of 0-255 in bits 56-63 of the register.

The bits of the $M_4$ field 1506 are as follows, in one example:
  Reserved: Bits 0-2 are reserved. Reserved bit positions of the $M_4$ field are ignored but should contain zeros; otherwise, the program may not operate compatibly in the future.
  Local Clearing Control (LC) 1560. When the local TLB clearing facility is installed, the LC bit, e.g., bit 3 of the $M_4$ field, controls whether only the TLB in the local CPU is cleared or whether the TLBs in all CPUs of the configuration are cleared. When the local TLB clearing facility is not installed, bit 3 of the $M_4$ field is reserved.

Page table origin 1570 in general register $R_1$ and page index 1580 in general register $R_2$ designate a page table entry, following the dynamic address translation rules for page table lookup. The page table origin e.g., is treated as a 64-bit address, and the addition is performed by using the rules for 64-bit address arithmetic, regardless of the current addressing mode, which is specified by bits 31 and 32 of the current program status word (PSW). A carry out of bit position 0 as a result of the addition of the page index and page table origin is not to occur. The address formed from these two components is a real or absolute address. The page invalid bit (e.g., 404 of FIG. 4) of this page table entry is set to one. During this procedure, in one example, the page table entry is not inspected for whether the page invalid bit is already one or for format errors. Additionally, the page frame real address contained in the entry is not checked for an addressing exception in this example.

When the IPTE range facility is installed and the $R_3$ field is nonzero, the instruction is interruptible, and processing is as follows, in one embodiment:
  1. The invalidation process described above is repeated for each subsequent entry in the page table until either the number of additional entries specified in bits 56-63 of general register $R_3$ have been invalidated or an interruption occurs.
  2. The page index in bits 44-51 of general register $R_2$ is incremented by the number of page table entries that were invalidated; a carry out of bit position 44 of general register $R_2$ is ignored.
  3. The additional entry count in bits 56-63 of general register $R_3$ is decremented by the number of page table entries that were invalidated.

Therefore, when the IPTE range facility is installed, the $R_3$ field is nonzero, and an interruption occurs (other than one that causes termination), general registers $R_2$ and $R_3$ have been updated, so that the instruction, when re-executed, resumes at the point of interruption.

When the IPTE range facility is not installed, or when the $R_3$ field is zero, the contents of registers $R_2$ and $R_3$ remain unchanged.

For each page table entry that is invalidated, the entire page table entry appears to be fetched concurrently from storage as observed by other CPUs. Subsequently, the byte containing the page invalid bit is stored. The fetch access to each page table entry is subject to key controlled protection, and the store access is subject to key controlled protection and low address protection.

A serialization function is performed before the operation begins and again after the operation is completed. As is the case for other serialization operations, this serialization applies only to this CPU; other CPUs are not necessarily serialized.

If no exceptions are recognized, this CPU clears selected entries from its TLB. Then, if the local TLB clearing facility is not installed, or if the facility is installed and the LC bit in the $M_4$ field is zero, this CPU signals all CPUs in the configuration to clear selected entries from their TLBs. For each page table entry invalidated, each affected TLB is cleared of at least those entries that have been formed using all of the following:
  The page table origin specified by general register $R_1$
  The page index specified by general register $R_2$
  The page frame real address contained in the designated page table entry.

The execution of Invalidate Page Table Entry is not completed on the CPU which executes it until the following occur, in one embodiment:
  1. All page table entries corresponding to the specified parameters have been invalidated.
  2. All entries corresponding to the specified parameters have been cleared from the TLB of this CPU. When the local TLB clearing facility is installed and the LC bit in the $M_4$ field is one, the execution of Invalidate Page Table entry is complete at this point and the following step is not performed.
  3. When the local TLB clearing facility is not installed, or when the facility is installed and the LC bit in the $M_4$ field is zero, all other CPUs in the configuration have completed any storage accesses, including the updating of the change and reference bits, by using TLB entries corresponding to the specified parameters.

When the IPTE range facility is installed, the $R_3$ field is nonzero, and the page index in general register $R_2$ plus the additional entry count in general register $R_3$ is greater than 255, a specification is recognized.

The operation is suppressed on all addressing and protection exceptions.

Condition Code: The code remains unchanged.

The Invalidate Page Table Entry instruction described above is only one example of an instruction requesting purging. Other instructions may also be used including, for instance, an Invalidate DAT Table Entry (IDTE) instruction and a Compare and Replace DAT Table Entry (CRDTE) instruction, as well as others. Further, the purge request may be provided or obtained in other ways.

The Invalidate DAT Table Entry (IDTE) instruction is similar to the IPTE instruction, except that designated region table or segment table entries (instead of page table entries) are invalidated and the associated TLB entries are purged. The IDTE instruction has a format that includes, e.g., an $R_3$ field specifying one register; an $M_4$ field specifying a mask; an $R_1$ field specifying another register; and an $R_2$ field specifying yet a further register, each of which is used to invalidate/purge particular entries. As with IPTE, IDTE uses an AGPT indicator (e.g., in the register specified by $R_2$ of IDTE) to specify whether selective purging is to be performed.

Similarly, the Compare and Replace DAT Table Entry (CRDTE) instruction (having a similar format of $R_3$, $M_4$, $R_1$, and $R_2$) may be used to selectively purge guest TLB entries of associated page table, segment table and/or region table entries being compared and replaced. Again, an AGPT indicator is provided to indicate whether selective purging is to be performed.

Other instructions may also be used; as well as other types of requests. Many variations are possible.

Figure 16:
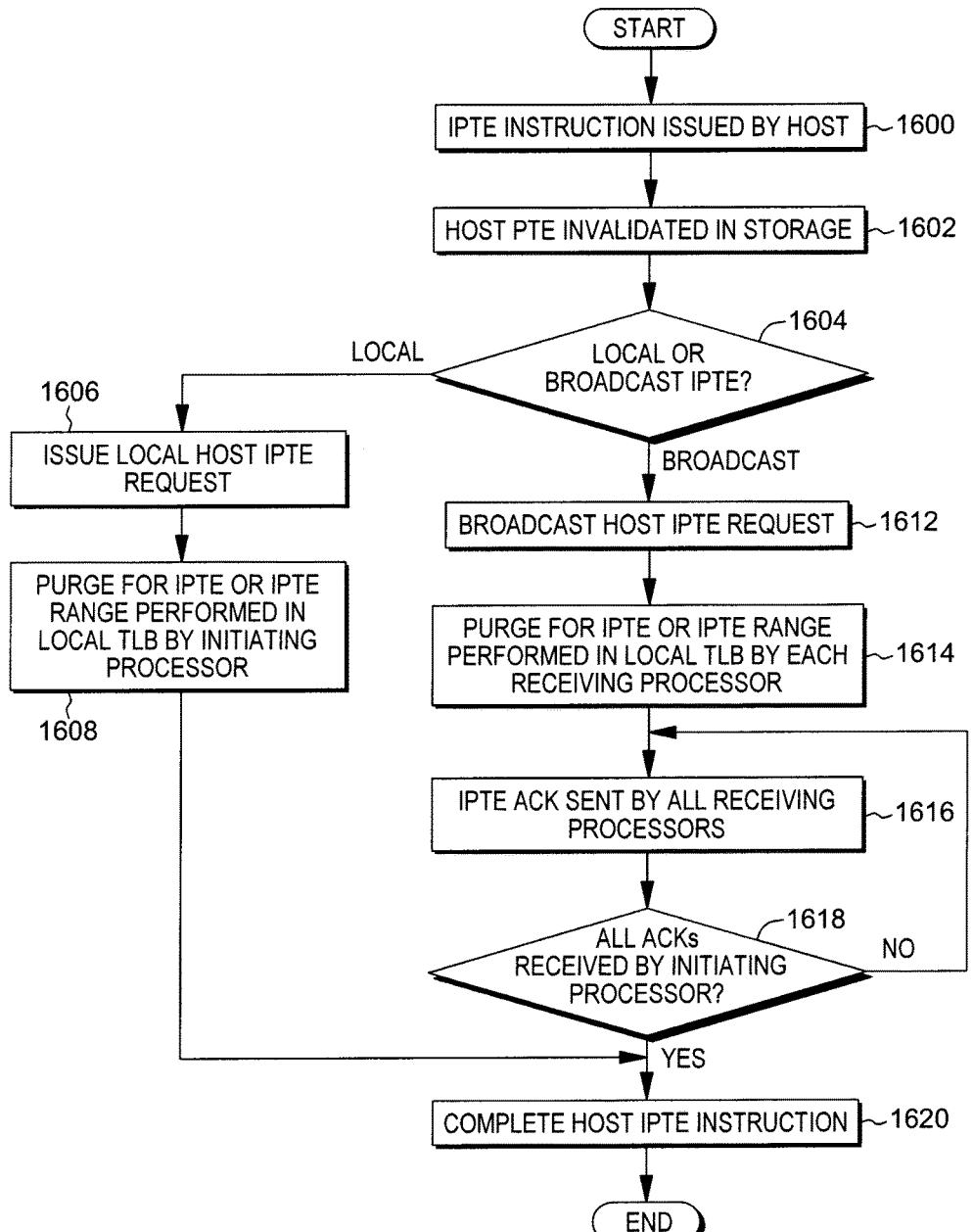
FIG. 16 depicts one embodiment of the logic to perform a host invalidate page table entry operation for one or more entries, in accordance with an aspect of the present invention.
Figure 17A:
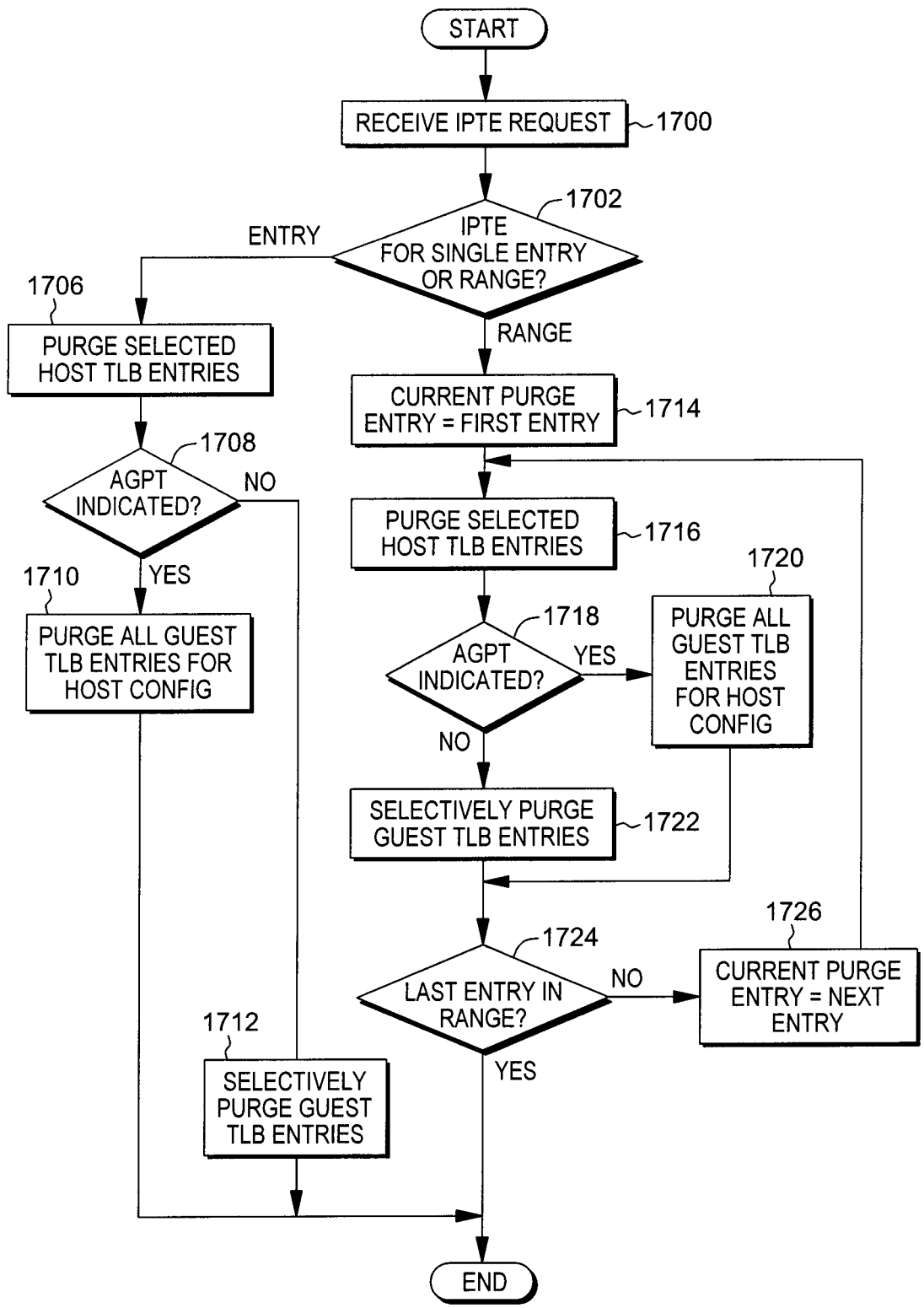
FIG. 17A depicts one embodiment of the logic to handle a received IPTE request based on a marking indicator, in accordance with an aspect of the present invention.
Figure 17B:
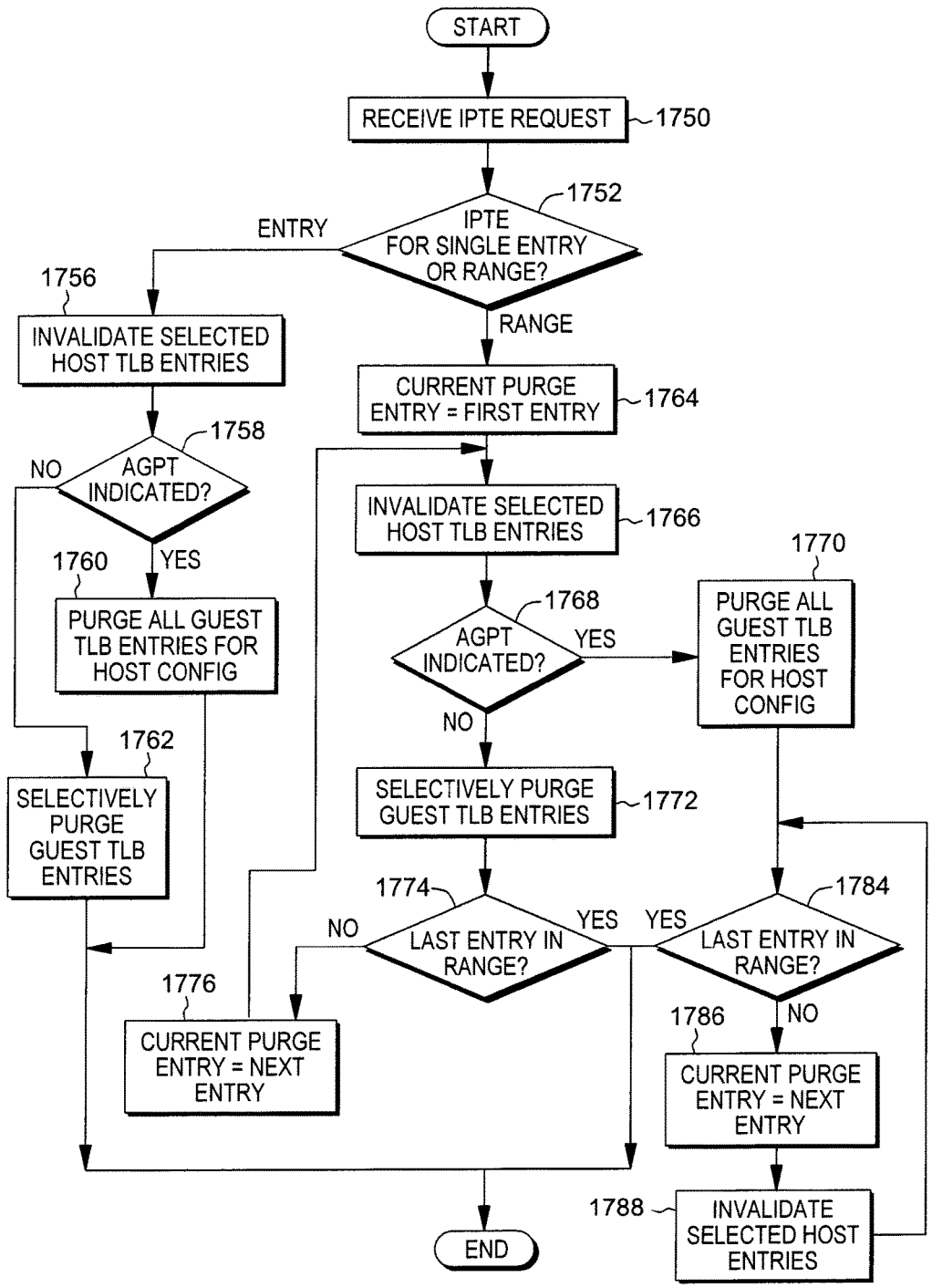
FIG. 17B depicts another embodiment of the logic to handle a received IPTE request based on a marking indicator, in accordance with an aspect of the present invention.

In accordance with an aspect of the present invention, the invalidation processing associated with IPTE, or other such instructions, uses the AGPT indicators (or other similar marking) to determine which entries are to be purged. This processing is further described with reference to FIGS. 16-17B. FIG. 16 depicts an embodiment in which the host IPTE instruction is performed, and FIGS. 17A-17B depict embodiments in which the AGPT indication is used by the receiving processors to determine if selective purging of guest entries can be performed.

Referring to FIG. 16, in one embodiment, an IPTE instruction is issued by the host program, STEP 1600. This IPTE instruction may include an indication of AGPT (e.g., 1556 in FIG. 15B), determined by the host program, for use by the processor. Alternatively, the initiating processor, i.e. the physical processor on which the IPTE was issued, can determine the AGPT state of the affected pages or it can be determined by the receiving processor(s). The host program, initiating processor, or receiving processor, for example, uses an internal marking (e.g., from the host PTE, associated PGSTE or storage key) to determine if the indication should be set. If indicated by either the host program or the initiating processor, then if any of the affected pages has an AGPT indication, the effective AGPT sent with the IPTE purge request is to have an indication of AGPT. Alternately, a set of AGPT indicators can be sent with the request where each bit in the set corresponds to a page in the range. In another alternative, the requesting processor can send multiple purge requests for any given range breaking a single range request into multiple requests broken up based on the AGPT indicator.

The initiating processor then invalidates the host PTE in storage, STEP 1602, and determines if the request is a local or a broadcast IPTE request, INQUIRY 1604. If the request is a local IPTE request, then the initiating processor issues a local IPTE request to itself, STEP 1606, and, in response, the local TLB is purged of host and guest entries relating to the IPTE instruction, STEP 1608, as further described with reference to FIGS. 17A-17B. The host IPTE instruction is then complete, STEP 1620.

Returning to INQUIRY 1604, if the IPTE instruction is a broadcast request, then the initiating physical processor broadcasts the host IPTE request, which may be for an entry or a range of entries and may have the AGPT bit set or not, to all specified processors, including the initiating processor, within the environment, STEP 1612. Each physical processor that receives the request, purges applicable host and guest TLB entries in the local TLB for the entry or the range of entries specified by the IPTE request, STEP 1614, as described with reference to FIGS. 17A-17B. Further, each processor that received the broadcast, subsequent to that processor performing the IPTE purge processing, sends an acknowledgment to the initiating processor, STEP 1616. A determination is made by the initiating processor as to whether all of the acknowledgments have been received, INQUIRY 1618. If not, processing continues to STEP 1616. However, if all of the acknowledgments have been received, then execution of the host IPTE instruction is complete, STEP 1620.

Further details associated with processing a received IPTE purge request are described with reference to FIG. 17A. In one embodiment, a processor receives the host IPTE purge request, which specifies an entry or a range of entries to be invalidated, STEP 1700. A determination is made by the receiving processor as to whether the IPTE purge request is for an entry or a range of entries, as indicated by the original IPTE request, INQUIRY 1702. If the request is for a single entry, then processing continues to STEP 1706, in which host entries specified by the request are purged. Next, the receiving processor determines if AGPT is indicated for the purged entry, INQUIRY 1708. The AGPT indication can be specified by the IPTE request or it can be determined by the receiving processor in which case it is obtained from a location (such as a storage key, a page status table entry, a host page table entry, a buffered TLB entry, etc.). If the AGPT indication is on (e.g., AGPT=0), indicating this host page is being used by the guest to back an address translation structure, then a purge of all guest entries associated with the requesting host configuration are purged, STEP 1710. Otherwise, if the AGPT indication is off (e.g., AGPT=1), indicating this host page is not being used by the guest to back an address translation structure, then, in accordance with an aspect of the present invention, a more selective purge is performed of guest entries, STEP 1712. For instance, fewer or even none of the guest entries are purged. As one particular example, the relevant guest PTE entry or entries are removed, and the relevant guest CRSTE entry or entries are not purged. Processing by the receiving processor is then complete.

Returning to INQUIRY 1702, if the IPTE instruction is for a range of entries, then a first entry of the range of entries is selected as the current entry being processed, STEP 1714. The host entries corresponding to the current purge entry are purged in the local TLB, STEP 1716. The receiving processor then determines if AGPT is indicated for the current purge entry, STEP 1718. As for the single entry purge, the AGPT is specified by the IPTE purge request or is determined by the receiving processor (e.g., based on the AGPT in the host PTE, PGSTE, storage key or buffered TLB entry). If AGPT is indicated (e.g., AGPT=0), then a purge of all guest TLB entries is performed, STEP 1720, or, if AGPT is off, then this guest purge is a selective purge, in accordance with an aspect of the present invention, STEP 1722, and purging is performed as described above for STEP 1712. Further, a determination is made as to whether this is the last entry in the range, INQUIRY 1724. If there are more entries in the range, then a next entry is selected as the current entry, STEP 1726, and processing continues to STEP 1716. However, if there are no more entries in the range, INQUIRY 1724, then processing is complete.

FIG. 17B shows another implementation of a receiving processor handling a host IPTE request for an entry or range of entries. In this embodiment, the handling of the instruction is similar to the one depicted in FIG. 17A, except that when an IPTE range is specified, once an AGPT entry is detected and all guest entries for this host configuration have been purged, then no further guest TLB entry purging is performed for subsequent entries.

In FIG. 17B, as in FIG. 17A, a host IPTE request is received, STEP 1750, and a determination is made by the initiating processor as to whether the IPTE purge request is for an entry or a range of entries, INQUIRY 1752. If the request is for a single entry then processing continues as in FIG. 17A. That is, host entries specified the request are purged, STEP 1756, and if AGPT is on for the purged entry, INQUIRY 1758, then all guest entries corresponding to the host IPTE request are purged, STEP 1760. Otherwise, selective guest entries are purged, STEP 1762, as described above. The AGPT indication is either specified by the IPTE request or it is obtained by the receiving processor from a location, such as a storage key, a page status table entry, a host page table entry, a buffered TLB entry, etc.

Returning to INQUIRY 1752, if the IPTE instruction is for a range of entries, a first entry of the range of entries is selected as the current entry being processed, STEP 1764. Next, the specified host TLB entries are purged, STEP 1766, and if AGPT is not on for the current entry, INQUIRY 1768, then guest entries are selectively purged from the local TLB, STEP 1772, as described above. Further, if this is not the last entry in the purge range, INQUIRY 1774, then the next entry is used as the current entry, STEP 1776, and processing returns to STEP 1766.

Returning to INQUIRY 1768, if AGPT is on for the current entry, then all guest entries associated with this host configuration are purged, STEP 1770. If this is not the last entry to process, INQUIRY 1784, then processing continues by purging only the specified host entries, since the guest entries are already purged. Thus, the next entry becomes the current entry, STEP 1786, and the selected host entries are purged, STEP 1788. Processing then continues to INQUIRY 1784. If this is the last entry to process, INQUIRY 1784, then processing is complete.

As indicated in INQUIRIES 1708, 1718, 1758 and 1768, a determination is made for an entry regarding the state of AGPT. As examples, this AGPT indicator is located in a host page table entry associated with the IPTE request, in a page status table entry determined from the host page table entry, in a storage key associated with the block of memory, and/or an indicator provided with the IPTE request. If the AGPT is not set (e.g., AGPT=1), then host IPTE is performed with selective guest purging, STEPS 1712, 1722, 1762 and 1772. That is, since the host page is not backing a guest DAT table, only selective guest TLB entries associated with this host configuration (e.g., relevant guest PTE entries) are to be purged However, other guest entries in the TLB, such as relevant guest CRSTE entries, are not cleared, in this example. FIG. 14 shows one example of an embodiment of a mechanism to perform this selective guest purging.

Described herein is a capability of using indicators to control purging. For example, as described herein, purge processing is performed based on the AGPT indicators.

Figure 18A:
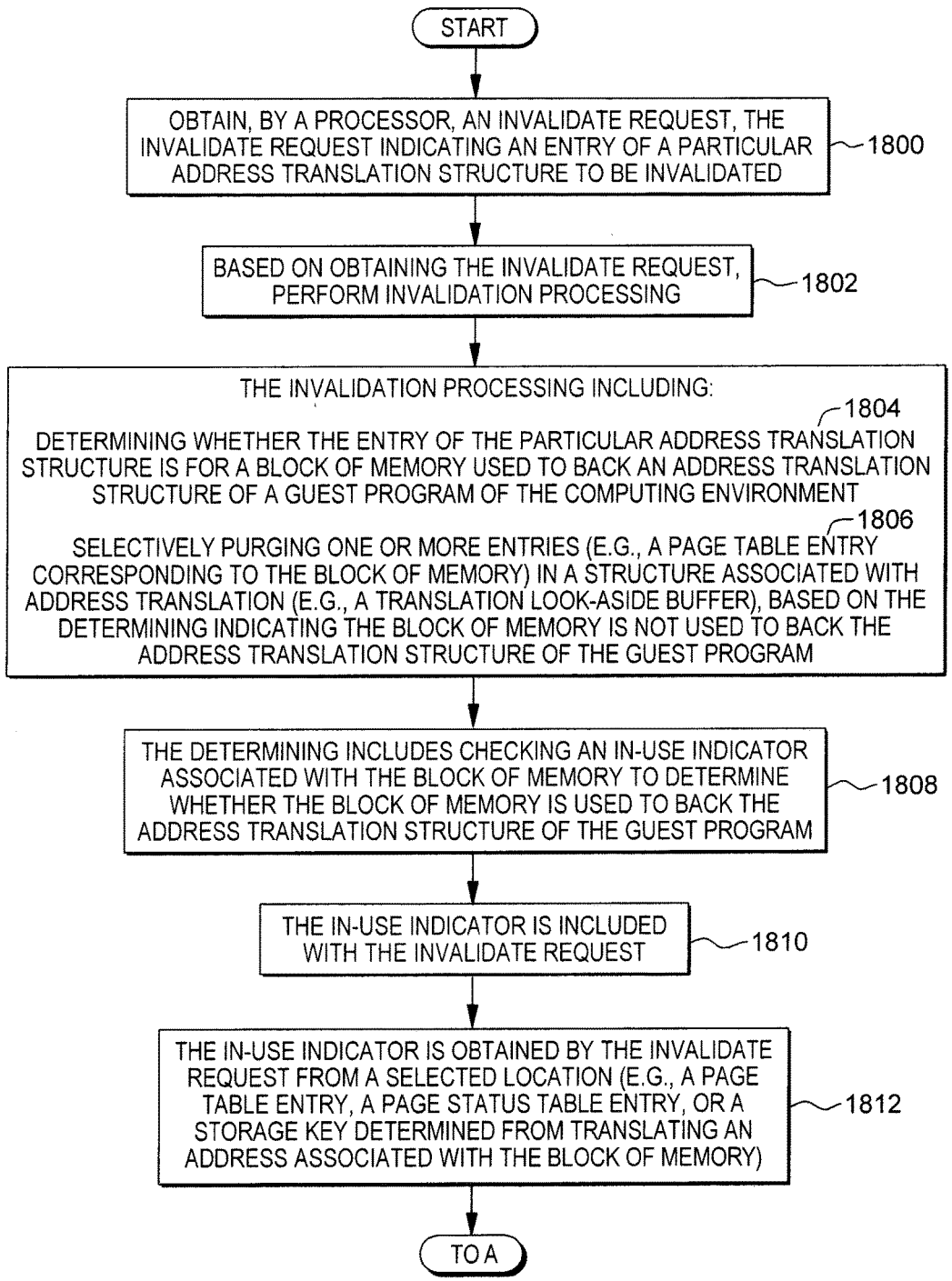
FIGS. 18A-18C depict one example of logic relating to managing invalidation of entries based on the use of active in use guest page indicators, in accordance with an aspect of the present invention.
Figure 18B:
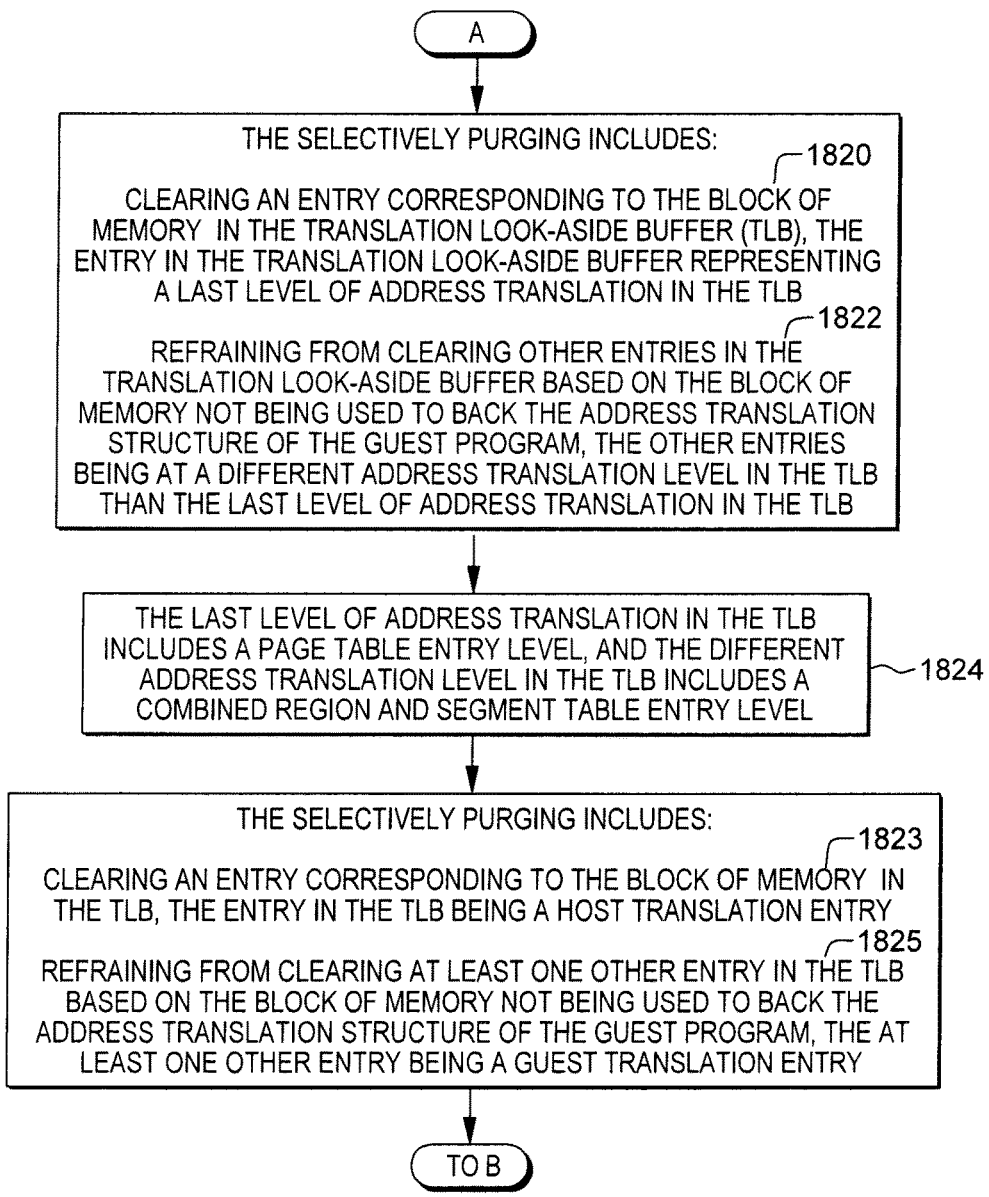

Further details associated with purge processing and the use of AGPT indictors are described with reference to FIGS. 18A-18C. Referring initially to FIG. 18A, a processor obtains an invalidate request, and the invalidate request indicates an entry of a particular address translation structure to be invalidated (1800). Based on obtaining the invalidate request, invalidation processing is performed (1802). The invalidation processing includes, for instance, determining whether the entry of the particular address translation structure is for a block of memory used to back an address translation structure of a guest program of the computing environment (1804), and selectively purging one or more entries (e.g., a page table entry corresponding to the block of memory) in a structure associated with address translation (e.g., a translation look-aside buffer), based on the determining indicating the block of memory is not used to back the address translation structure of the guest program (1806) (i.e., based on the determining indicating an absence of the block of memory to back the address translation structure).

In one example, the determining includes checking an in-use indicator associated with the block of memory to determine whether the block of memory is used to back the address translation structure of the guest program (1808). As examples, the in-use indicator is included with the invalidate request (1810), or the in-use indicator is obtained by the invalidate request from a selected location (e.g., a page table entry, a page status table entry, or a storage key determined from translating an address associated with the block of memory) (1812).

Further, in one embodiment, the selectively purging includes clearing an entry corresponding to the block of memory in the translation look-aside buffer, the entry in the translation look-aside buffer representing a last level of address translation in the translation look-aside buffer (1820, FIG. 18B), and refraining from clearing other entries in the translation look-aside buffer based on the block of memory not being used to back the address translation structure of the guest program (1822). The other entries being at a different address translation level in the translation look-aside buffer than the last level of address translation in the translation look-aside buffer.

In one example, the last level of address translation in the translation look-aside buffer includes a page table entry level, and the different address translation level in the translation look-aside buffer includes a combined region and segment table entry level (1824). Other examples also exist.

As a further example, the selectively purging includes clearing an entry corresponding to the block of memory in the translation look-aside buffer, the entry in the translation look-aside buffer being a host translation entry (1823); and refraining from clearing at least one other entry in the translation look-aside buffer based on the block of memory not being used to back the address translation structure of the guest program, the at least one other entry being a guest translation entry (1825).

Figure 18C:
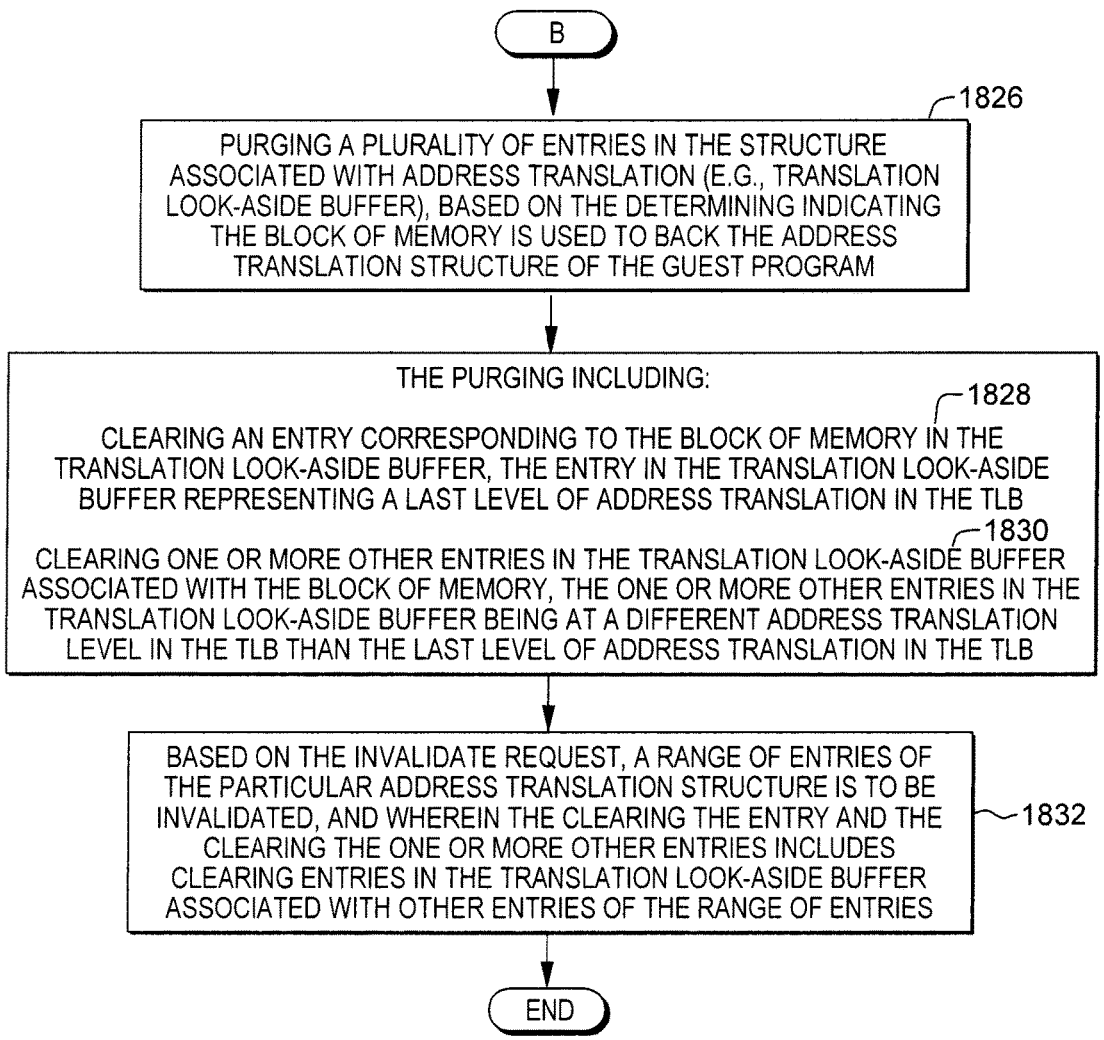

In a further aspect, with reference to FIG. 18C, a plurality of entries in the structure associated with address translation (e.g., translation look-aside buffer) are purged, based on the determining indicating the block of memory is used to back the address translation structure of the guest program (1826). The purging includes, for instance, clearing an entry corresponding to the block of memory in the translation look-aside buffer, the entry in the translation look-aside buffer representing a last level of address translation in the translation look-aside buffer (1828), and clearing one or more other entries in the translation look-aside buffer associated with the block of memory, the one or more other entries in the translation look-aside buffer being at a different address translation level in the translation look-aside buffer than the last level of address translation in the translation look-aside buffer (1830).

In one example, based on the invalidate request, a range of entries of the particular address translation structure is to be invalidated, and wherein the clearing the entry and the clearing the one or more other entries includes clearing entries in the translation look-aside buffer associated with other entries of the range of entries (1832).

As used herein, main memory and main storage are used interchangeably unless otherwise noted explicitly or implicitly.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 19:
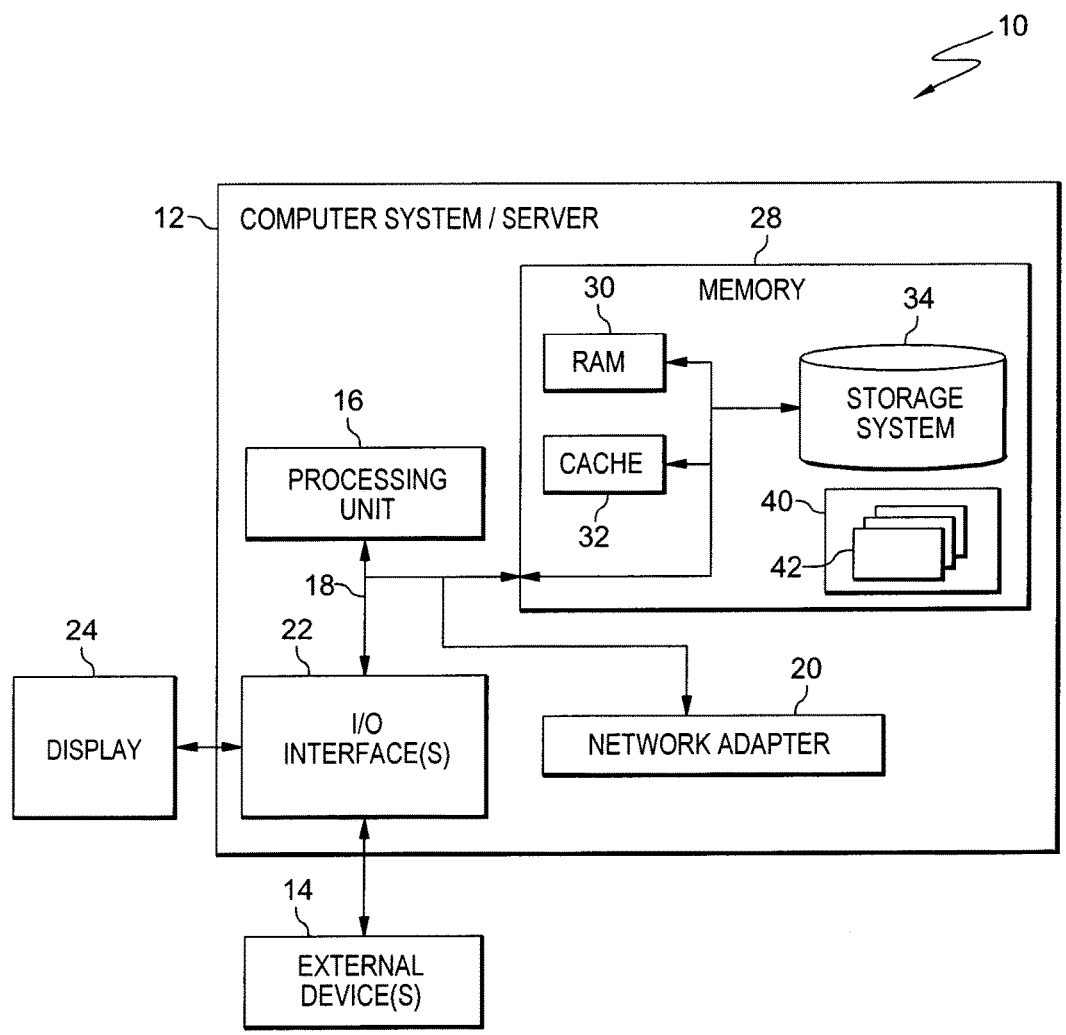
FIG. 19 depicts one embodiment of a cloud computing node.

Referring now to FIG. 19, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 20:
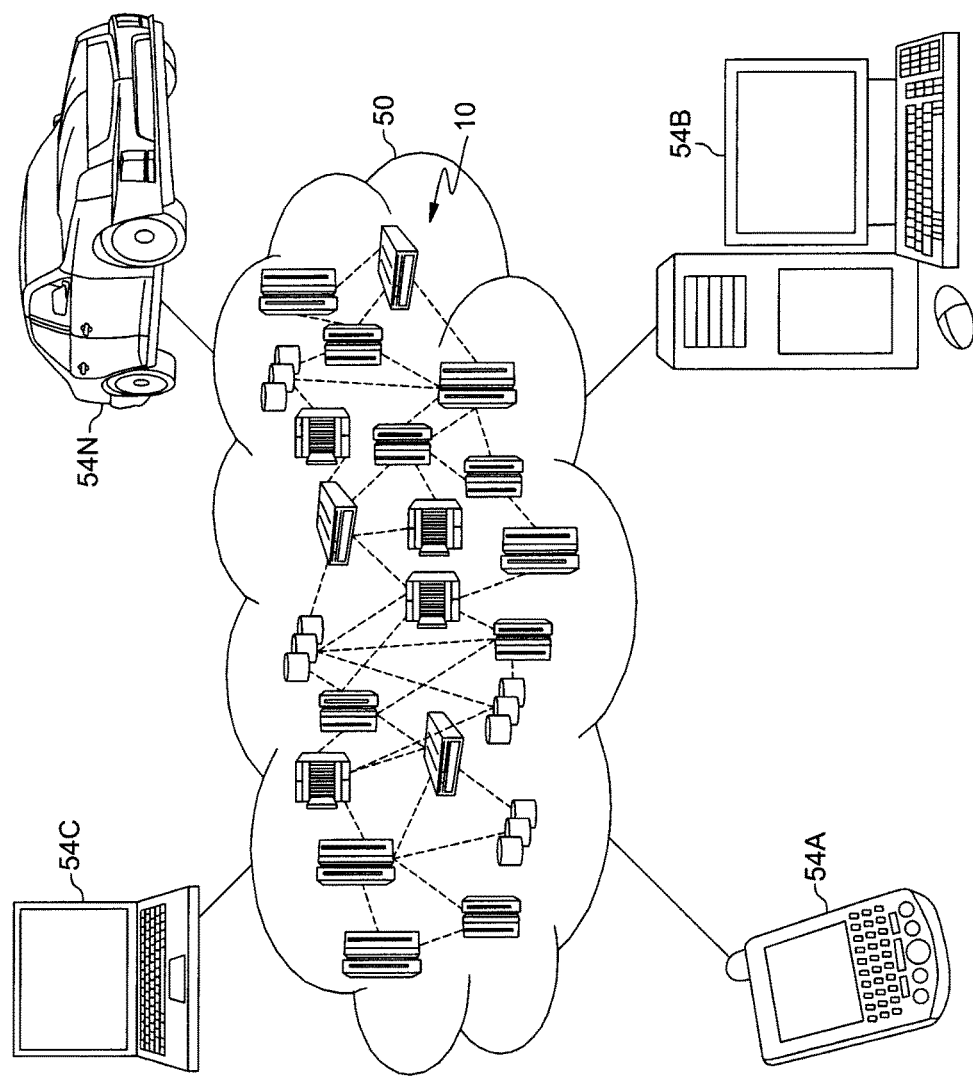
FIG. 20 depicts one embodiment of a cloud computing environment.

Referring now to FIG. 20, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 20 are intended to be illustrative only and that computing nodes 10 and cloud computing environment 50 can communicate with any type of computerized device over any type of network and/or network addressable connection (e.g., using a web browser).

Figure 21:
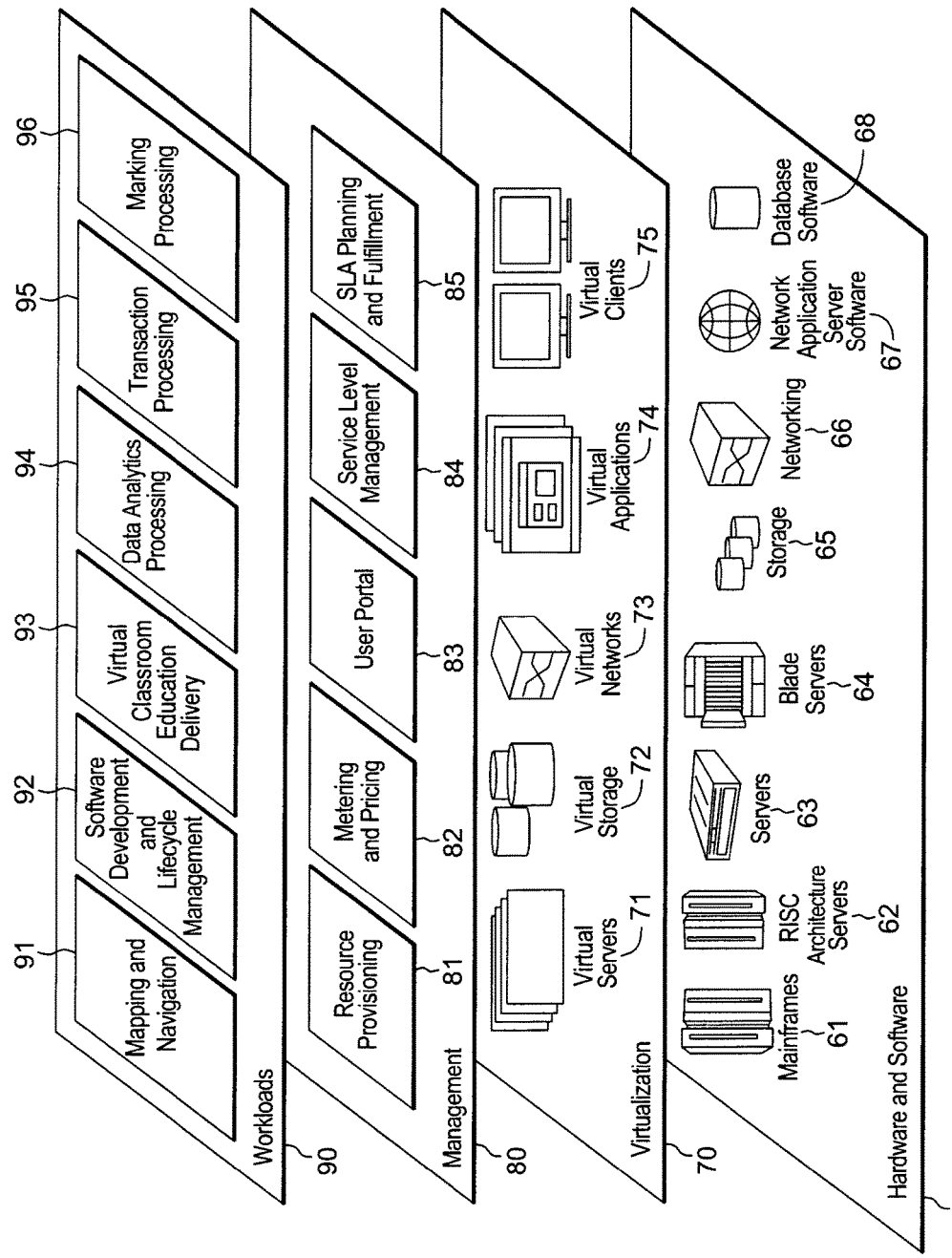
FIG. 21 depicts one example of abstraction model layers.

Referring now to FIG. 21, a set of functional abstraction layers provided by cloud computing environment 50 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and marking processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of managing invalidation of entries relating to address translation of a computing environment, said computer-implemented method comprising:
   obtaining, by a processor, an invalidate request, the invalidate request indicating an entry of a particular address translation structure to be invalidated;
   based on obtaining the invalidate request, performing invalidation processing, the invalidation processing comprising:
      determining whether the entry of the particular address translation structure is for a block of memory used to back an address translation structure of a guest program of the computing environment; and
      selectively purging one or more entries in a structure associated with address translation, based on the determining indicating the block of memory is not used to back the address translation structure of the guest program.

2. The computer-implemented method of claim 1, wherein the determining comprises checking an in-use indicator associated with the block of memory to determine whether the block of memory is used to back the address translation structure of the guest program.

3. The computer-implemented method of claim 2, wherein the in-use indicator is included with the invalidate request.

4. The computer-implemented method of claim 2, wherein the in-use indicator is obtained by the invalidate request from a selected location.

5. The computer-implemented method of claim 4, wherein the selected location is selected from a group consisting of a page table entry, a page status table entry, and a storage key determined from translating an address associated with the block of memory.

6. The computer-implemented method of claim 1, wherein the structure associated with address translation is a translation look-aside buffer, and wherein the one or more entries include a page table entry corresponding to the block of memory.

7. The computer-implemented method of claim 1, wherein the structure associated with address translation is a translation look-aside buffer, and wherein the selectively purging comprises:
   clearing an entry corresponding to the block of memory in the translation look-aside buffer, the entry in the translation look-aside buffer representing a last level of address translation in the translation look-aside buffer; and
   refraining from clearing other entries in the translation look-aside buffer based on the block of memory not being used to back the address translation structure of the guest program, the other entries being at a different address translation level in the translation look-aside buffer than the last level of address translation in the translation look-aside buffer.

8. The computer-implemented method of claim 7, wherein the last level of address translation in the translation look-aside buffer comprises a page table entry level, and the different address translation level in the translation look-aside buffer comprises a combined region and segment table entry level.

9. The computer-implemented method of claim 1, wherein the structure associated with address translation is a translation look-aside buffer, and wherein the selectively purging comprises:
   clearing an entry corresponding to the block of memory in the translation look-aside buffer, the entry in the translation look-aside buffer being a host translation entry; and
   refraining from clearing at least one other entry in the translation look-aside buffer based on the block of memory not being used to back the address translation structure of the guest program, the at least one other entry being a guest translation entry.

10. The computer-implemented method of claim 1, further comprising purging a plurality of entries in the structure associated with address translation, based on the determining indicating the block of memory is used to back the address translation structure of the guest program, the structure associated with the address translation being a translation look-aside buffer, and wherein the purging comprises:
   clearing an entry corresponding to the block of memory in the translation look-aside buffer, the entry in the translation look-aside buffer representing a last level of address translation in the translation look-aside buffer; and
   clearing one or more other entries in the translation look-aside buffer associated with the block of memory, the one or more other entries in the translation look-aside buffer being at a different address translation level in the translation look-aside buffer than the last level of address translation in the translation look-aside buffer.

11. The computer-implemented method of claim 10, wherein based on the invalidate request, a range of entries of the particular address translation structure is to be invalidated, and wherein the clearing the entry and the clearing the one or more other entries includes clearing entries in the translation look-aside buffer associated with other entries of the range of entries.

* * * * *